(12) United States Patent
Toriumi et al.

(10) Patent No.: US 7,079,733 B2
(45) Date of Patent: Jul. 18, 2006

(54) OPTICAL COMMUNICATION SYSTEM, OPTICAL COMMUNICATION APPARATUS, AND OPTICAL CABLE

(75) Inventors: Yoichi Toriumi, Tokyo (JP); Nobuhiko Tsukahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 169 days.

(21) Appl. No.: 10/849,657

(22) Filed: May 20, 2004

(65) Prior Publication Data

US 2005/0053340 A1 Mar. 10, 2005

(30) Foreign Application Priority Data

May 23, 2003 (JP) ............................. 2003-146814

(51) Int. Cl.
*G02B 6/44* (2006.01)
*H04B 10/08* (2006.01)
*H01R 33/945* (2006.01)

(52) U.S. Cl. ..................... 385/101; 385/88; 385/89; 385/92; 385/128; 398/33; 439/577

(58) Field of Classification Search ............... 385/101, 385/53, 71, 72, 60, 139, 88, 89, 92, 123, 385/128; 439/577; 398/33
See application file for complete search history.

(56) References Cited

U.S. PATENT DOCUMENTS 4,612,670 A * 9/1986 Henderson ................ 398/22
5,394,503 A * 2/1995 Dietz et al. ............... 385/135
6,456,768 B1 * 9/2002 Boncek et al. ............. 385/100
6,821,146 B1 * 11/2004 Tolmie ...................... 439/577
2002/0126967 A1 9/2002 Panak et al. ............ 385/139 X

FOREIGN PATENT DOCUMENTS

GB 2 200 009 7/1988 ............. 385/139 X

OTHER PUBLICATIONS

Patent Abstracts of Japan vol. 0082, No. 29 (E-273), Oct. 20, 1984 & JP 59 111433 A (Hitachi Seisakusho KK) Jun. 27, 1984.

* cited by examiner

*Primary Examiner*—Brian M. Healy
(74) *Attorney, Agent, or Firm*—Frommer Lawrence & Haug LLP; William S. Frommer; Thomas F. Presson

(57) ABSTRACT

An optical communication apparatus is connected to the other communication apparatus by an optical fiber. The optical fiber cable comprises conducting wires. By interconnecting an output-side conducting circuit provided to the optical communication apparatus and an input-side conducting circuit provided to the other communication apparatus, a detection circuit is constituted. The optical communication apparatus comprises a monitor for monitoring a state of conduction of the detection circuit and an output control portion for controlling a laser diode. When the optical fiber cable is extracted from the optical communication apparatus, it is extracted from the other communication apparatus, and it is broken, the output-side and input-side conducting circuits are cut off. The monitor monitors a change in the state of conduction. If the monitor detects a change in the state of conduction, the output control portion stops emission of light from the laser diode.

14 Claims, 16 Drawing Sheets

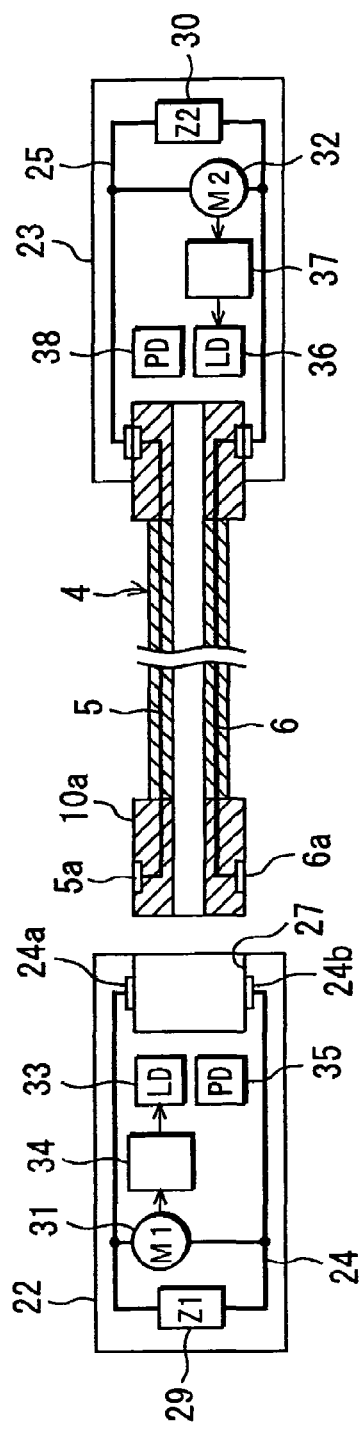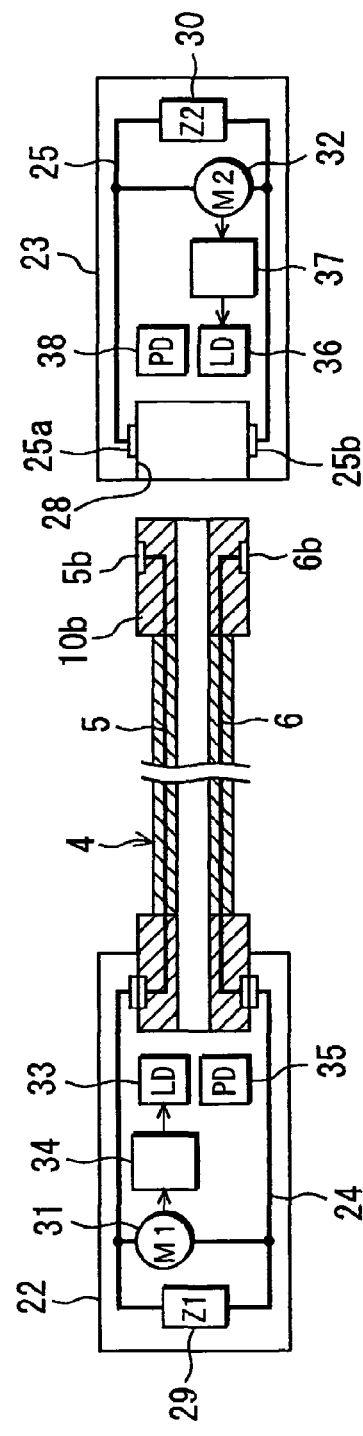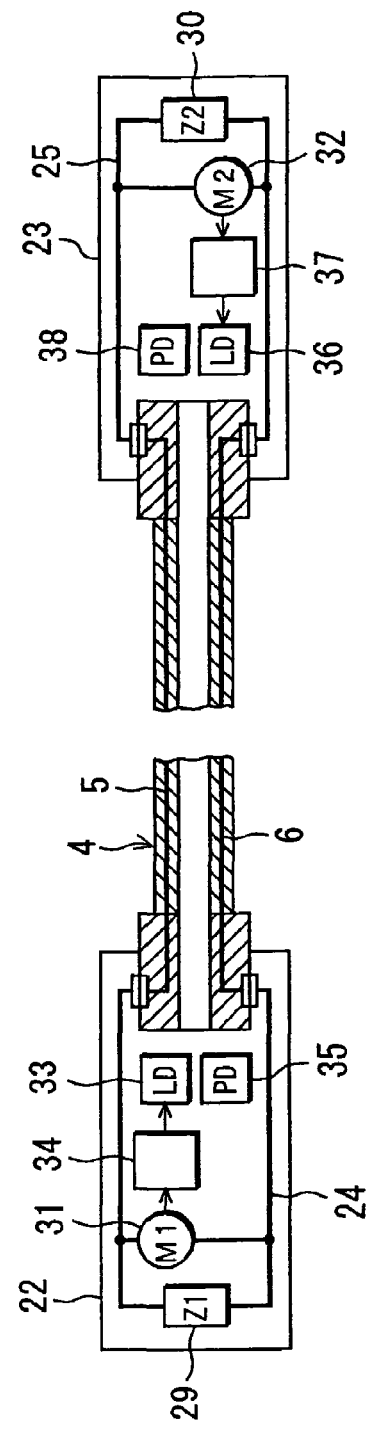
F I G. 9A  F I G. 9B  F I G. 9C

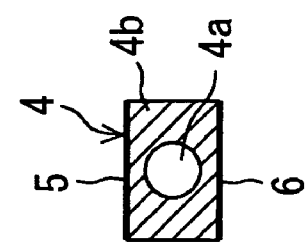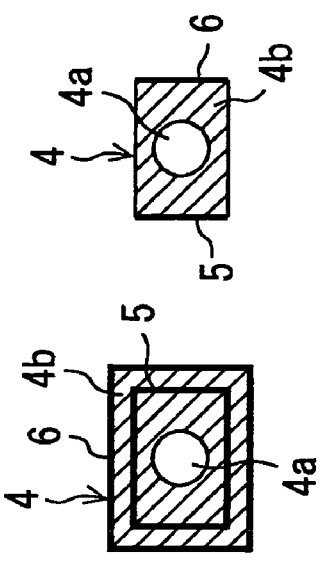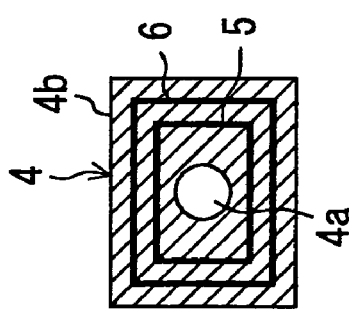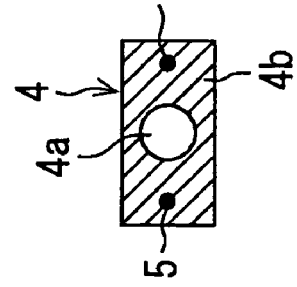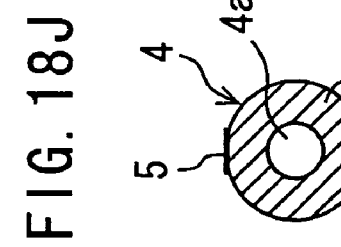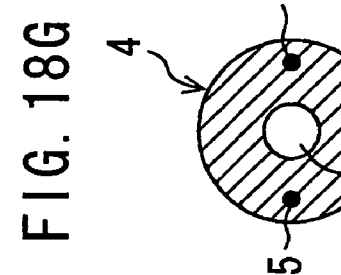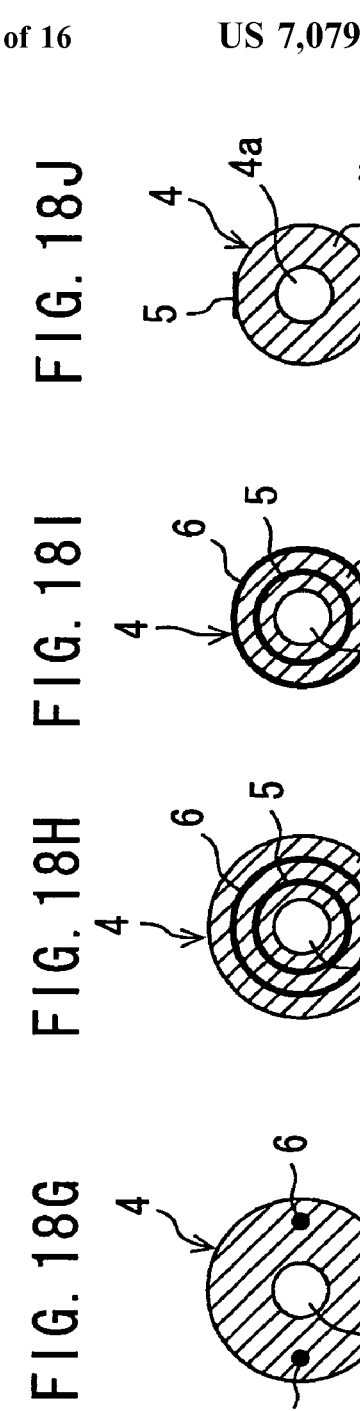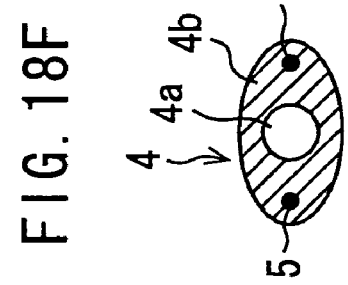

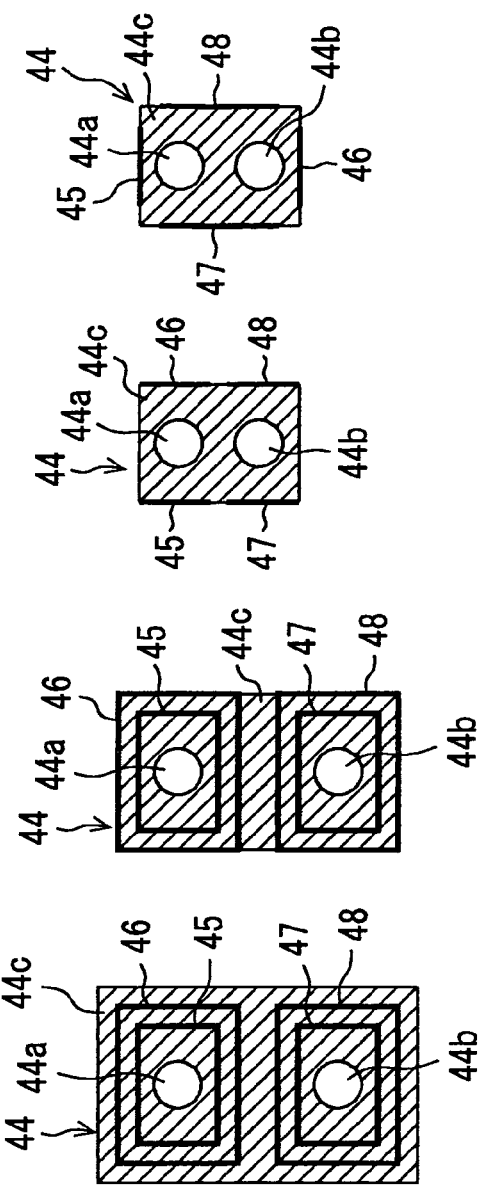
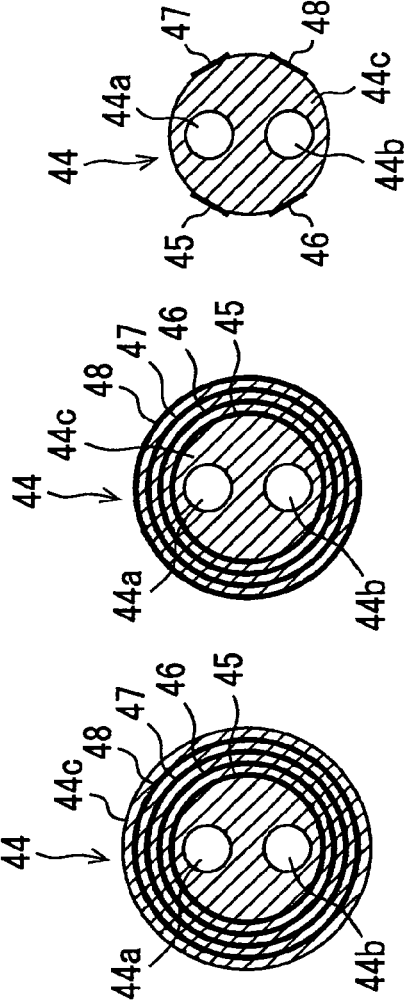
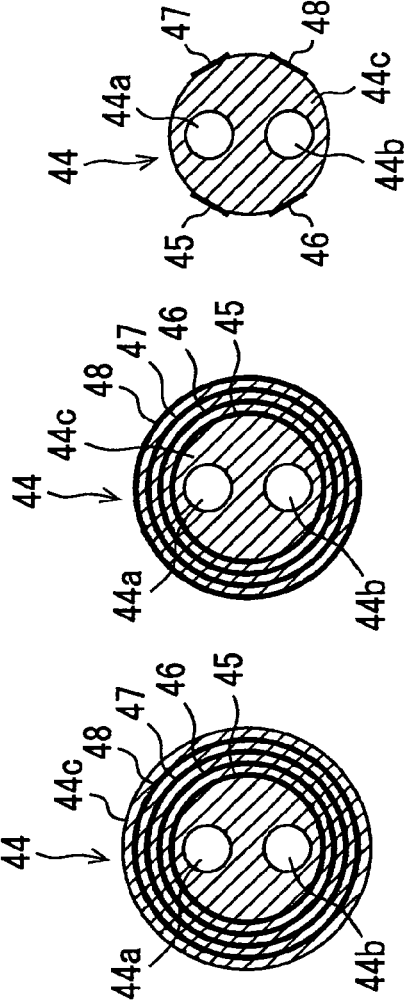
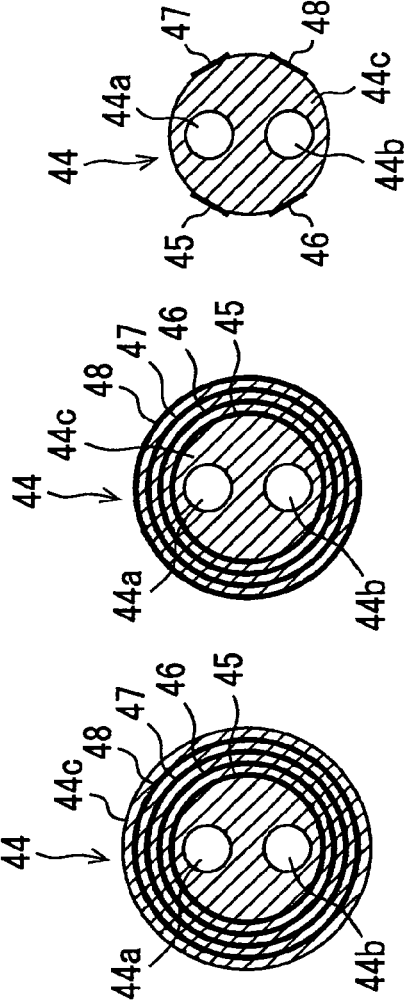
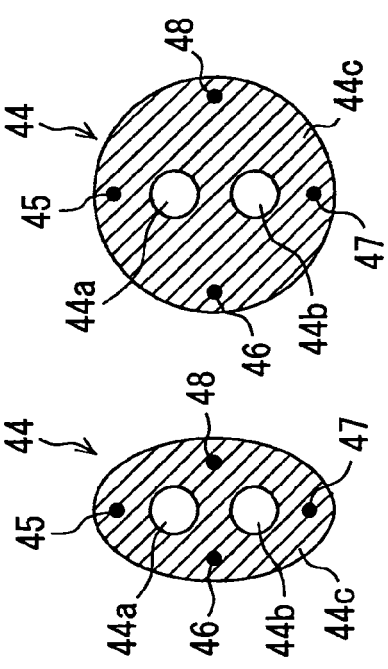

FIG. 20A FIG. 20B FIG. 20C FIG. 20D FIG. 20E
FIG. 20F FIG. 20G FIG. 20H FIG. 20I FIG. 20J

OPTICAL COMMUNICATION SYSTEM, OPTICAL COMMUNICATION APPARATUS, AND OPTICAL CABLE

BACKGROUND OF THE INVENTION

1. Field of the Invention

The present invention relates to an optical communication system in which one optical communication apparatus and another are coupled to each other by an optical cable and the optical communication apparatus and the optical cable that constitute this optical communication system.

2. Description of Related Art

In an optical communication system in which optical communication apparatus that is equipped with a light emitting element for outputting an optical signal and a light receiving element for receiving the optical signal is coupled to another by an optical fiber cable, the optical fiber cable can be attached to and detached from the optical communication apparatus.

In the optical communication apparatus, as far as power is applied to them, for example, the light emitting element continues to emit light. Therefore, even if the optical fiber cable is not coupled to the optical communication apparatus, the light emitting element continues to emit light in the optical communication apparatus.

A technology for solving this problem is known which attempts to reduce power consumption by stopping emission of light from the light emitting element when the optical fiber cable is not coupled (see Japanese Patent Application Laid-Open No. 2000-340306).

FIGS. 1A–1D are conceptual diagrams each for showing a configuration of a conventional optical communication system, which incorporates a mechanism capable of stopping emission of light from light emitting element when an optical cable is not coupled.

As shown in FIG. 1A, a conventional optical communication system 101 has such a configuration that an optical communication apparatus 102 and an optical communication apparatus 103 are coupled to each other by an optical fiber cable 104. The one optical communication apparatus 102 is equipped with a light emitting element 105 such as a laser diode. The other optical communication apparatus 103, on the other hand, is equipped with a light receiving element 106 such as a photodiode 106.

The optical fiber cable 104 is provided with a plug 107 at each of its opposite ends so that it can be attached to and detached from each optical communication apparatus 102, 103. The optical communication apparatus 102 equipped with the light emitting element 105 is also equipped with a detection circuit 108 for detecting whether this plug 107 is connected to it. This detection circuit 108 is arranged to be switched between, for example, a conductive state and a nonconductive state in accordance with whether the plug 107 is connected or not. In addition, it is equipped with a monitor 109 for monitoring whether the detection circuit 108 is conductive so that in accordance with a result of monitoring by this monitor 109, a control system, not shown, may control emission of light from the light emitting element 105.

In this conventional optical communication system 101, if the optical fiber cable 104 is extracted from the optical communication apparatus 102, shown in FIG. 1B, the detection circuit 108 is switched, for example, from the conductive state to the nonconductive state. The monitor 109 detects a change in the state, thereby enabling stopping emission of light from the light emitting element 105.

On the contrary, if the optical fiber cable 104 is extracted from the optical communication apparatus 103, shown in FIG. 1C or if the optical fiber cable 104 is broken, shown in FIG. 1D, the detection circuit 108 stays unchanged in state of conduction. Thus, it is impossible to stop emission of light from the light emitting element 105.

FIGS. 2A–2C are conceptual diagrams each for showing a configuration of another conventional optical communication system which has realized bidirectional communication. This conventional optical communication system 111 has realized single-core bidirectional optical communication and has such a configuration that an optical communication apparatus 112 and an optical communication apparatus 113 are coupled to each other by an optical fiber cable 114 as shown in FIG. 2A. The one optical communication apparatus 112 is equipped with a light emitting element 115a such as a laser diode and a light receiving element 116a such as a photodiode. The other optical communication apparatus 113, on the other hand, is equipped with a light emitting element 115b such as a laser diode and a light receiving element 116b such as a photodiode.

The optical fiber cable 114 is provided with a plug 117 at each of its opposite ends so that it can be attached to and detached from each optical communication apparatus 112, 113. The optical communication apparatus 112 is equipped with a detection circuit 118a for detecting whether this plug 117 is connected to it. This detection circuit 118a is arranged to be switched between, for example, the conductive state and the nonconductive state in accordance with whether the plug 117 is connected to it or not. In addition, it is equipped with a monitor 119a for monitoring whether the detection circuit 118a is conductive. In accordance with a result of monitoring by this monitor 119a, a control system, not shown, may control emission of light from the light emitting element 115a.

The optical communication apparatus 113, on the other hand, is equipped with a detection circuit 118b for detecting whether the plug 117 is connected to it. This detection circuit 118b is arranged to be switched between, for example, the conductive state and the nonconductive state in accordance with whether the plug 117 is connected to it or not. In addition, it is equipped with a monitor 119b for monitoring whether the detection circuit 118b is conductive. In accordance with a result of monitoring by this monitor 119b, a control system, not shown, may control emission of light from the light emitting element 115b.

In this conventional optical communication system 111, if the optical fiber cable 114 is extracted from the optical communication apparatus 112, shown in FIG. 2B, the detection circuit 118a is switched, for example, from the conductive state to the nonconductive state. The monitor 119a detects a change in the state, thereby enabling stopping emission of light from the light emitting element 115a.

However, the detection circuit 118b in the optical communication apparatus 113 to which the optical fiber cable 114 is coupled stays unchanged in state of conduction, so that it is impossible to stop emission of light from the light emitting element 115b. This holds true also with a case where the optical fiber cable 114 is extracted from the optical communication apparatus 113, not shown though.

Furthermore, if the optical fiber cable 114 is broken as shown in FIG. 2C, neither the detection circuit 118a in the optical communication apparatus 112 nor the detection circuit 118b in the optical communication apparatus 113 is changed in state of conduction. Emission of light cannot be stopped either from the light emitting element 115a or 115b.

As described above, in the conventional optical communication system, if an optical fiber cable is extracted from an optical communication apparatus itself equipped with a light emitting element, the system can detect the extraction to stop emission of light from the light emitting element. However, if the optical fiber cable is extracted from the other optical communication apparatus or if it is broken, the extraction cannot be detected. This has brought about a problem that if the optical fiber cable is extracted from the other optical communication apparatus or if it is broken, it is impossible to stop emission of light from the light emitting element.

SUMMARY OF THE INVENTION

To solve these problems, the present invention has been developed, and it is an object of the present invention to provide an optical communication system, an optical communication apparatus, and an optical cable for enabling controlling emission of light from an optical communication apparatus by detecting that the optical fiber is extracted or broken.

To solve the above-mentioned problems, there is provided an optical communication system related to the present invention. The optical communication system comprises a first optical communication apparatus having light emitter for outputting an optical signal, a second optical communication apparatus having light receiver for receiving the optical signal, and an optical cable for coupling the first and second communication apparatuses to each other. The optical cable is attached to and detached from each of the first and second optical communication apparatuses. The optical cable also includes an inter-apparatus conductor for conducting electricity to the first and second optical communication apparatuses. Each of the first and second optical communication apparatuses includes an internal conductor for connecting the inter-apparatus conductor to conduct electricity to it. The optical cable is coupled to each of the first and second optical communication apparatuses, to thereby constitute a detection circuit for detecting a connection of the optical cable. Thus, the detecting circuit is constituted by connecting the internal conductors of the first and second communication apparatuses to each other through the inter-apparatus conductor. The first optical communication apparatus having the light emitter includes a monitor for monitoring a state of conduction of the detection circuit, and a controller for controlling output of the light emitter based on a result of monitoring by the monitor.

An optical communication apparatus related to the present constitutes the optical communication system. The optical communication apparatus comprises at least light emitter for outputting an optical signal of a group of the light emitter and light receiver for receiving the optical signal. The optical communication apparatus detachably couples an optical cable on which signal light from the light emitter impinges. The optical communication apparatus comprises an internal conductor connected to inter-apparatus conductor that is included in the optical cable to thereby constitute a detection circuit for detecting a connection of the optical cable, via the inter-apparatus conductor, together with the other optical communication apparatus that is coupled to the other end of the optical cable. The optical communication apparatus also comprises a monitor for monitoring a state of conduction of the detection circuit, and controller for controlling output of the light emitter based on a result of monitoring by the monitor.

Alternatively, an optical communication apparatus related to the present invention which detachably couples an optical cable comprises a light receiver for receiving an optical signal through the optical cable, and an internal conductor connected to an inter-apparatus conductor in the optical cable to thereby constitute a detection circuit for detecting a connection of the cable, together with the other optical communication apparatus which is coupled to the other end of the optical cable via the inter-apparatus conductor.

An optical cable related to the present invention couples to each other a first optical communication apparatus having a light emitter for emitting an optical signal and a second optical communication apparatus having a light receiver for receiving the optical signal. The optical cable comprises at least one fiber core for propagating an optical signal, attachments each for attaching the optical cable detachably to each of the first and second optical communication apparatuses, said attachments being provided to one end and the other end of the fiber core, and inter-apparatus conductor for interconnecting these two attachments. The inter-apparatus conductor is connected to the internal conductor provided to each of the first and second optical communication apparatuses, thereby constituting a detection circuit for detecting a connection of the optical cable to each of the first and second optical communication apparatuses.

According to an optical communication system, an optical communication apparatus, and an optical cable which are related to the present invention, by coupling to each other through the optical cable the first optical communication apparatus having the light emitter for outputting an optical signal and the second optical communication apparatus having the light receiver for receiving the optical signal, signal light emitted from the light emitter of the first optical communication apparatus can be propagated through the optical cable and applied to the light receiver of the second optical communication apparatus.

Further, when the first and second optical communication apparatuses are coupled to each other through the optical cable, internal conductors in the first and second optical communication apparatuses are connected to the inter-apparatus conductor of the optical cable. In such a manner, a detection circuit is constituted in which the two internal conductors are electrically connected to each other via the inter-apparatus conductor. Then, in the first optical communication apparatus having the light emitter to output the optical signal, the monitor monitors a state of conduction of the detection circuit.

If the optical cable is extracted from the first optical communication apparatus, the internal conductor in the second optical communication apparatus having the light receiver is cut off from the detection circuit monitored by the monitor.

If the internal conductor is cut off from the detection circuit, a state of conduction of the detection circuit is changed. When the monitor detects this change in state of conduction, the controller controls output of the light emitter.

Also in a case where the optical cable is extracted from the second optical communication apparatus, the internal conductor in the second optical communication apparatus is cut off from the detection circuit monitored by the monitor. Similarly, in a case where the optical cable is broken, the internal conductor in the second optical communication apparatus is cut off from the detection circuit monitored by the monitor. If the internal conductor is thus cut off from the detection circuit and hence the monitor detects a change in state of conduction, the controller controls the output of the light emitter.

Thus, by monitoring the state of conduction of the detection circuit by means of the monitor in the first optical communication apparatus, it is possible to detect not only that the optical cable is extracted from any one of the first and second optical communication apparatuses, but also that the optical cable is broken.

Therefore, the optical communication system according to the invention allows output of the light emitter to be controlled, for example, emission of light therefrom to stop or a quantity of emitted light to be suppressed not only if the optical cable is extracted from any one of the first and second optical communication apparatuses, but also if the optical cable is broken.

Thus, the optical communication system according to the present invention prevents light from being leaked out of the optical communication apparatus from which the optical cable is extracted or from the optical cable where it is broken, thereby improving safety. The system also suppresses dissipation power because emission of light is stopped or suppressed if communication is disabled.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIGS. 9A–9C are conceptual diagrams each for showing operations of the optical communication system of the second embodiment of the invention;

FIGS. 18A–18J are cross-sectional views each for showing a configuration of an optical fiber cable;

FIGS. 19A–19J are cross-sectional views each for showing a configuration of another optical fiber cable; and FIGS. 20A–20J are cross-sectional views each for showing a configuration of a further optical fiber cable.

DESCRIPTION OF THE PREFERRED EMBODIMENTS

The following will describe embodiments of an optical communication system, an optical communication apparatus, and an optical fiber cable of the present invention with reference to drawings.

Figure 1A:
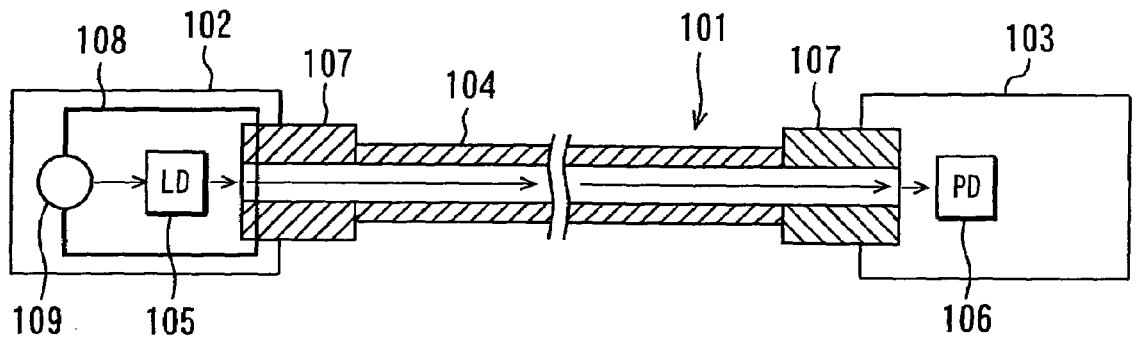
FIGS. 1A–1D are conceptual diagrams each for showing a configuration of a conventional optical communication system.
Figure 1B:
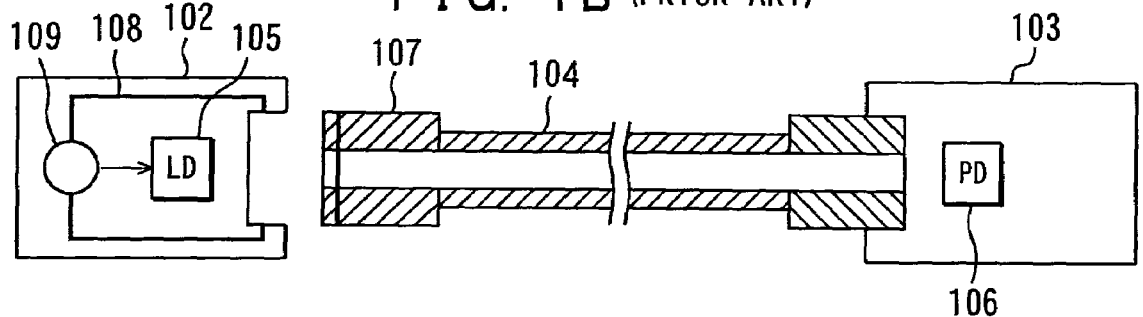
Figure 1C:
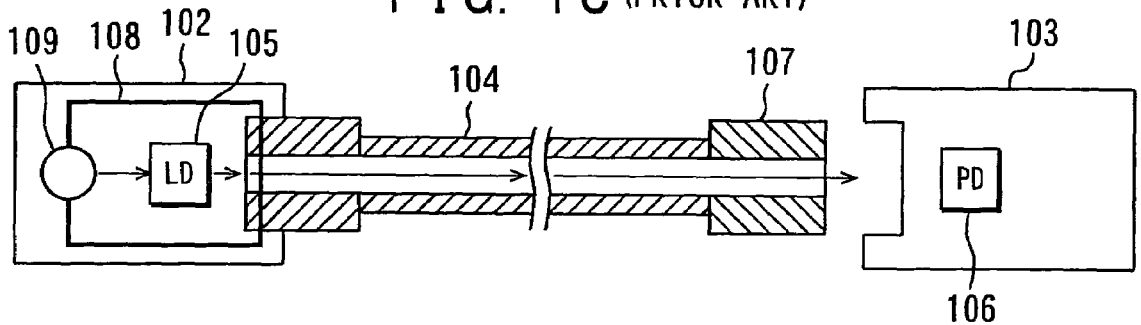
Figure 1D:
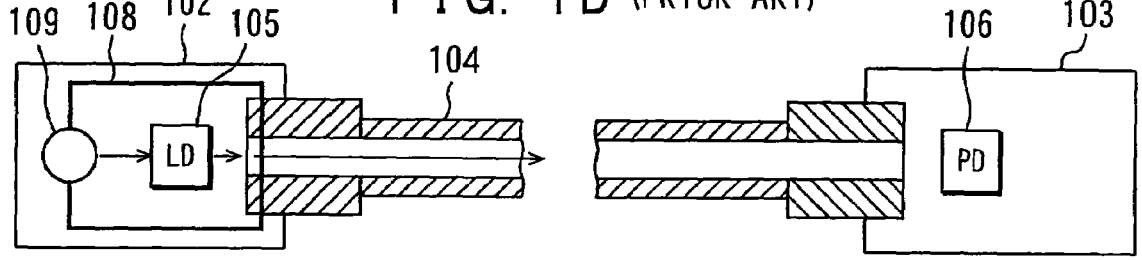
Figure 2A:
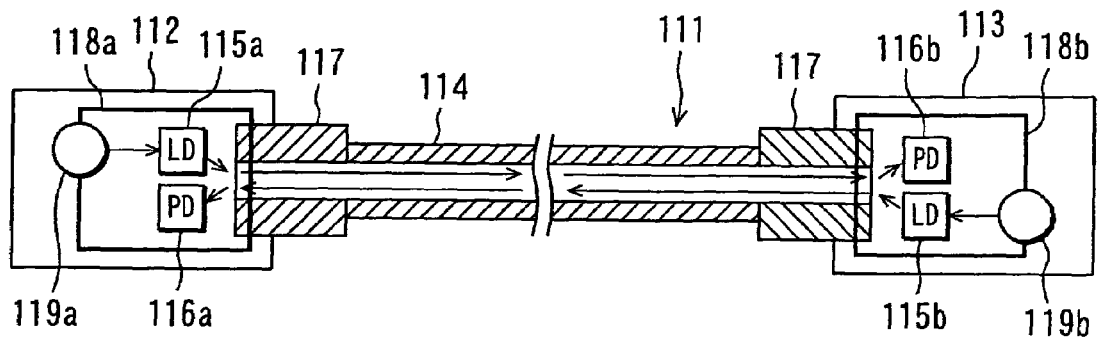
FIGS. 2A–2C are conceptual diagrams each for showing a configuration of another conventional optical communication system.
Figure 2B:
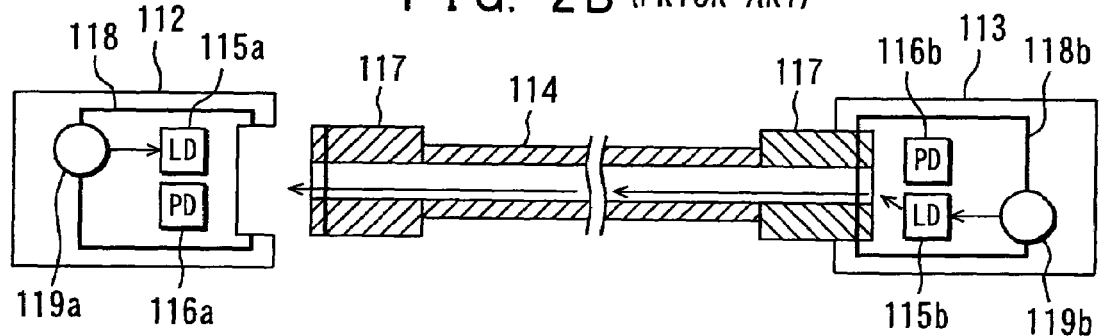
Figure 2C:
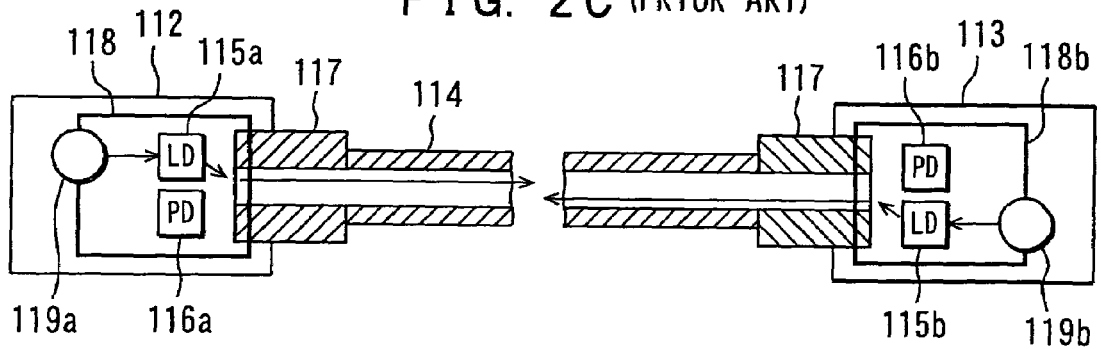
Figure 3:
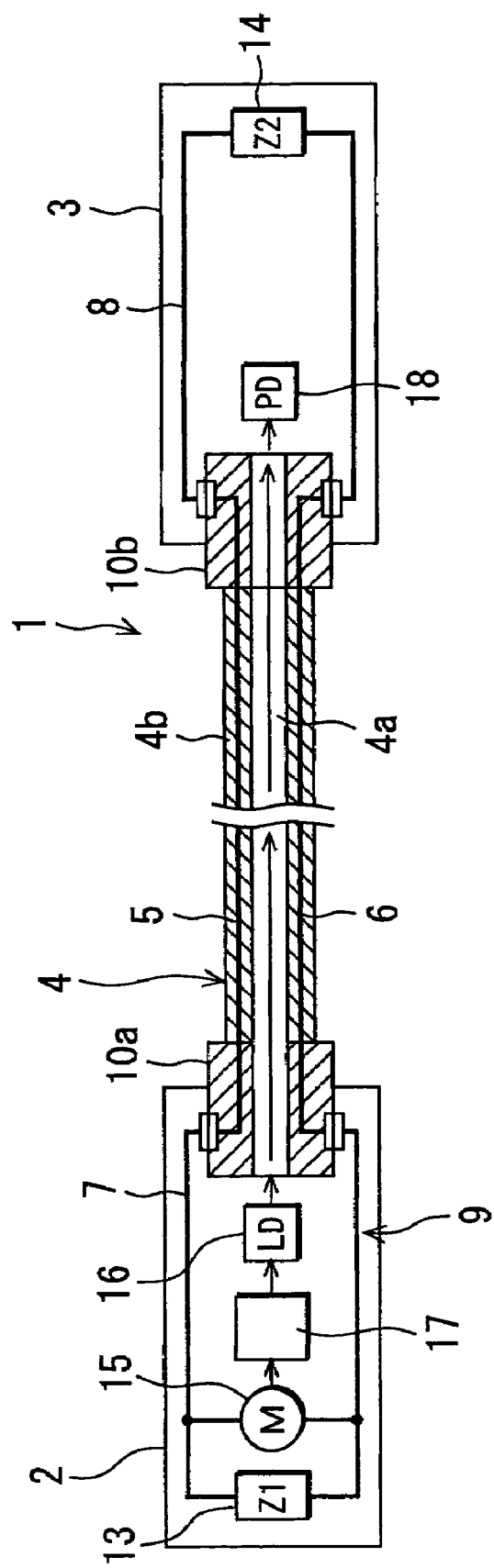
FIG. 3 is a conceptual diagram for showing a configuration of an optical communication system according to a first embodiment of the invention.
Figure 4A:
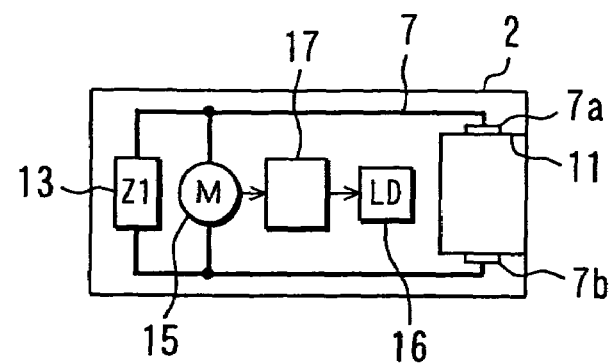
FIGS. 4A and 4B are conceptual diagrams each for showing a configuration of an optical communication apparatus that constitutes the optical communication system of the first embodiment of the invention.
Figure 4B:
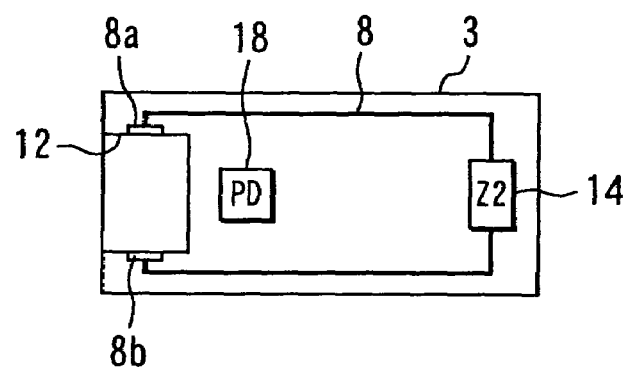
Figure 5:
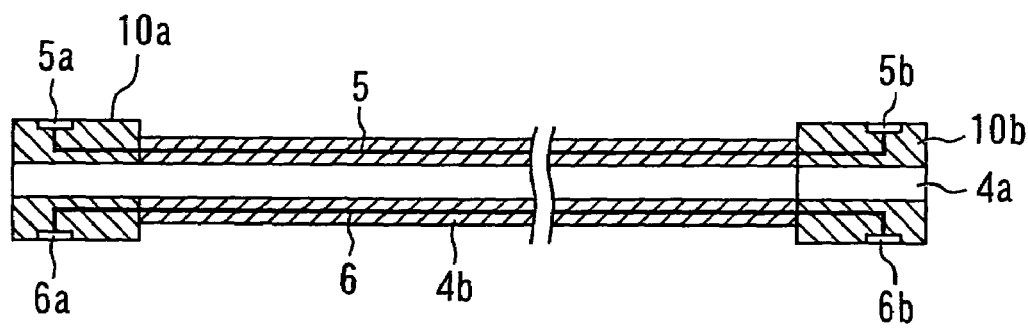
FIG. 5 is a conceptual diagram for showing a configuration of an optical fiber cable that constitutes the optical communication system of the first embodiment of the invention.

FIG. 3 is a conceptual diagram for showing a configuration of an optical communication system according to a first embodiment of the invention. FIGS. 4A and 4B are conceptual diagrams each for showing a configuration of an optical communication apparatus that constitutes the optical communication system of the first embodiment of the invention. FIG. 5 is a conceptual diagram for showing a configuration of an optical fiber cable that constitutes the optical communication system of the first embodiment of the invention.

An optical communication system 1 of the first embodiment has such a configuration that an optical communication apparatus 2 and the other optical communication apparatus 3 are coupled to each other through an optical fiber cable 4, to realize a unidirectional optical communication. The optical fiber cable 4 is one example of an optical cable and, as shown in FIG. 5, has an optical fiber core 4a through which an optical signal is ID propagated and a coating 4b for protecting this optical fiber core 4a. The optical fiber cable 4 is provided with two conducting wires 5 and 6 along this optical fiber core 4a. The conducting wires 5 and 6 constitutes inter-apparatus conductor and electrically interconnects the optical communication apparatuses 2 and 3 coupled to each other by the optical fiber cable 4.

The optical communication apparatus 2 comprises an output-side conducting circuit 7 connected to the conducting wires 5 and 6. The optical communication apparatus 3, on the other hand, comprises an input-side conducting circuit 8 connected to the conducting wires 5 and 6. The output-side conducting circuit 7 and the input-side conducting circuit 8 constitute the internal conductor. The output-side conducting circuit 7 and the input-side conducting circuit 8 are combined with the conducting wires 5 and 6 to constitute a detection circuit 9 as shown in FIG. 3.

It is to be noted that the optical fiber cable 4 can be attached to and detached from each of the optical communication apparatuses 2 and 3. When the optical communication apparatuses 2 and 3 are coupled to each other through the optical fiber cable 4, the detection circuit 9 is constituted.

Specifically, as shown in FIG. 5, the optical fiber cable 4 is provided with a plug 10a at its one end and with a plug 10b at its other end. These plugs 10a and 10b are each one example of detachable attachment. The following description is made on the assumption that the plug 10a is connected to the optical communication apparatus 2 and the plug 10b, to the optical communication apparatus 3. It is to be noted that the plugs 10a and 10b may or may not be of the same shape so as to fit a configuration of the apparatus to which they are to be connected.

The optical communication apparatus 2 comprises a jack 11 which the plug 10a is inserted into and extracted from as shown in FIG. 4A, while similarly the optical communication apparatus 3 comprises a jack 12 which the plug 10b is inserted into and extracted from as shown in FIG. 4B. This gives such a configuration that the optical fiber cable 4 can be attached to and detached from each of the optical communication apparatuses 2 and 3.

The one plug 10a of the optical fiber cable 4 is provided with one terminal 5a of the conducting wire 5 and one terminal 6a of the conducting wire 6. The other plug 10b is provided with the other terminal 5b of the conducting wire 5 and the other terminal 6b of the conducting wire 6.

Thus, in the optical fiber cable 4, the terminal 5a on the side of the one plug 10a and the terminal 5b on the side of the other plug 10b are electrically connected to each other by the conducting wire 5. Similarly the terminal 6a on the side of the one plug 10a and the terminal 6b on the side of the other plug 10b are electrically connected to each other by the conducting wire 6.

The jack 11 of the optical communication apparatus 2 comprises one terminal 7a and the other terminal 7b of the output-side conducting circuit 7. The jack 12 of the optical communication apparatus 3 comprises one terminal 8a and the other terminal 8b of the input-side conducting circuit 8.

In this configuration, by inserting the one plug 10a of the optical fiber cable 4 into the jack 11 of the optical communication apparatus 2, the terminal 7a on the side of the jack 11 comes in contact with the terminal 5a on the side of the plug 10a and the terminal 7b on the side of the jack 11 comes in contact with the terminal 6a on the side of the plug 10a, so that the output-side conducting circuit 7 is electrically connected to the conducting wires 5 and 6.

Further, by inserting the other plug 10b of the optical fiber cable 4 into the jack 12 of the optical communication apparatus 3, the terminal 8a on the side of the jack 12 comes in contact with the terminal 5b on the side of the plug 10b and the terminal 8b on the side of the jack 12 comes in contact with the terminal 6b on the side of the plug 10b, so that the input-side conducting circuit 8 is electrically connected to the conducting wires 5 and 6.

By thus inserting the one plug 10a of the optical fiber cable 4 into the jack 11 of the optical communication apparatus 2 and the other plug 10b of the optical fiber cable 4 into the jack 12 of the optical communication apparatus 3, each of the output-side conducting circuit 7 and the input-side conducting circuit 8 is connected to the conducting wires 5 and 6, thereby constituting the detection circuit 9.

This detection circuit 9 is arranged so as to vary, for example, in circuit resistance if the optical fiber cable 4 is extracted from the optical communication apparatus 2 or the optical communication apparatus 3 or if the optical fiber cable 4 is broken. This allows extraction or breakage of the optical fiber cable 4 to be detected.

For example, the output-side conducting circuit 7 is provided with a power supply, not shown, as well as an impedance 13 having an arbitrary resistance value (Z1). The input-side conducting circuit 8 is given an impedance 14 having an arbitrary resistance value (Z2). The detection circuit 9 has such a configuration that the impedances 13 and 14 are connected in parallel. Further, the output-side conducting circuit 7 is provided with a monitor 15. The monitor 15 measures, for example, a resistance value of the detection circuit 9.

The optical communication apparatus 2 comprises a laser diode (LD) 16 as opposed to the optical fiber cable 4, which is coupled to the jack 11. This laser diode 16 constitutes a light emitter and emits signal light, which impinges on the optical fiber cable 4.

Further, the optical communication apparatus 2 comprises a drive circuit, not shown, for driving the laser diode 16 and an output control portion 17 for controlling this drive circuit to control emission of light from the laser diode 16. The output control portion 17 constitutes a controller and controls the monitor 15 to monitor a state of conduction of the detection circuit 9. The output control portion 17 controls output of the laser diode 16 if the monitor 15 detects a change, for example, in resistance value the detection circuit 9.

The optical communication apparatus 3 comprises a photodiode (PD) 18 as opposed to the optical fiber cable 4, which is coupled to the jack 12. This photodiode 18 constitutes a light receiver and receives signal light launched from the optical fiber cable 4.

Figure 6A:
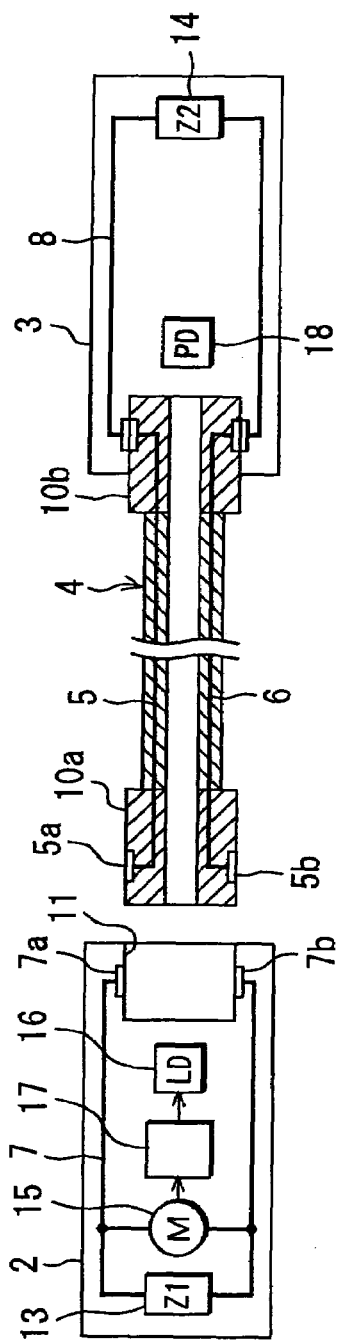
FIGS. 6A–6C are conceptual diagrams each for showing operations of the optical communication system of the first embodiment of the invention.
Figure 6B:
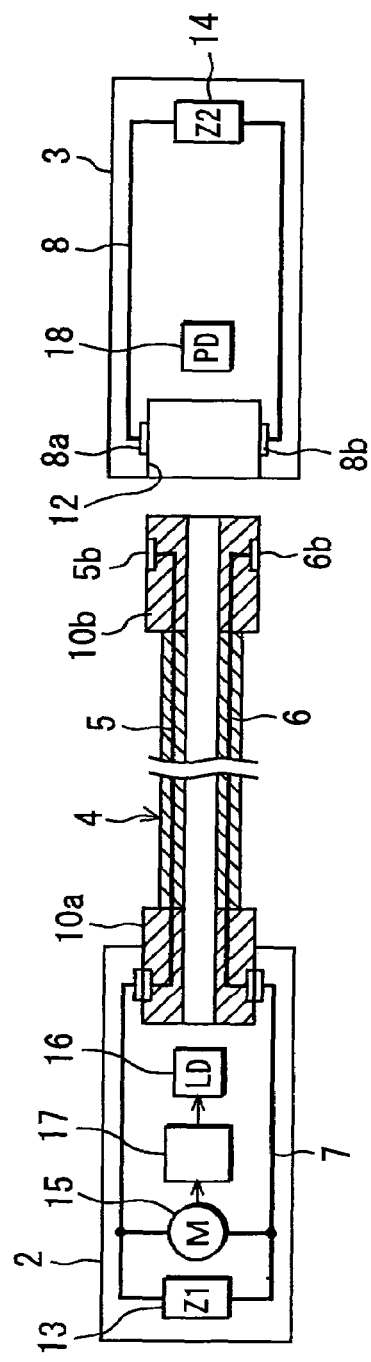
Figure 6C:
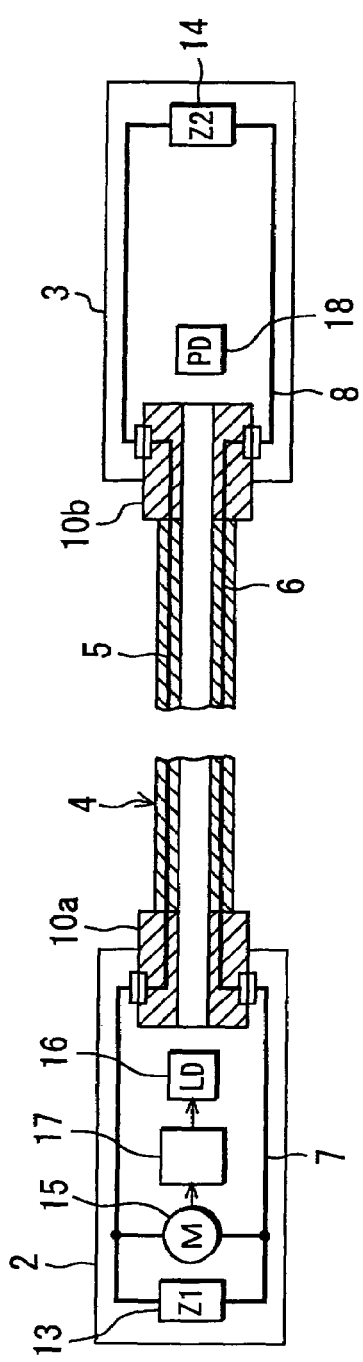

FIGS. 6A–6C are conceptual diagrams each for showing operations of the optical communication system of the first embodiment of the invention. The following will describe the operations of the optical communication system 1 of the first embodiment. First, as shown in FIG. 3, the one plug 10a of the optical fiber cable 4 is inserted into the jack 11 of the optical communication apparatus 2 and the other plug 10b of the optical fiber cable 4 is inserted into the jack 12 of the optical communication apparatus 3. This gives such a configuration of the optical communication system 1 that the optical communication apparatuses 2 and 3 are coupled to each other through the optical fiber cable 4.

In the optical communication system 1, when the optical communication apparatus 2 receives an electric signal, the laser diode 16 converts this electric signal into signal light to emit it. The signal light emitted from the laser diode 16 in the optical communication apparatus 2 impinges on one end of the optical fiber core 4a of the optical fiber cable 4. After having entered the optical fiber core 4a, the signal light is propagated through this optical fiber core 4a and launched from the other end thereof. The signal light launched from the other end of the optical fiber core 4a impinges on the photodiode 18 in the optical communication apparatus 3. Then, the photodiode 18 converts the signal light into an electric signal and outputs it to an outside of the optical communication apparatus 3. In such a manner, unidirectional optical communication from the optical communication apparatus 2 to the optical communication apparatus 3 is realized in the optical communication system 1 of the first embodiment.

In this optical communication system 1, each of the output-side conducting circuit 7 in the optical communication apparatus 2 and the input-side conducting circuit 8 in the optical communication apparatus 3 is connected to the conducting wires 5 and 6 of the optical fiber cable 4, thereby constituting the detection circuit 9.

In this configuration, the monitor 15 provided to the output-side conducting circuit 7 monitors the state of conduction of this detection circuit 9 and the output control portion 17 controls emission of light from the laser diode 16. That is, since the input-side conducting circuit 8 is connected to the output-side conducting circuit 7 through the conducting wires 5 and 6, both of the impedances 13 and 14 are connected to the monitor 15 provided on the side of the optical communication apparatus 2.

As can be seen from the above, in a condition where the optical communication apparatuses 2 and 3 are normally coupled to each other through the optical fiber cable 4, the resistance value of the detection circuit 9 becomes a parallel-connection resistance value of the impedance 13 (Z1) and the impedance 14 (Z2) because the output-side conducting circuit 7 and the input-side conducting circuit 8 are connected to each other.

Accordingly, the monitor 15 recognizes the case where the resistance value of the detection circuit 9 is a parallel-connection resistance value of the impedance 13 (Z1) and the impedance 14 (Z2) as a normal state of conduction of the detection circuit 9. It is to be noted that the monitor 15 may be arranged to recognize a case where a voltage or current value of the detection circuit 9 corresponds to this parallel-connection resistance value as the normal state of conduction of the detection circuit 9.

If the optical fiber cable 4 is extracted from the optical communication apparatus 2 as shown in FIG. 6A, the plug 10a comes off from the jack 11, so that the terminal 7a on the side of the jack 11 is separated from the terminal 5a on the side of the plug 10a and the terminal 7b on the side of the jack 11 is separated from the terminal 6a on the side of the plug 10a.

As a result, the output-side conducting circuit 7 is electrically cut off from the conducting wires 5 and 6. That is, the output-side conducting circuit 7 and the input-side conducting circuit 8 are electrically cut off from each other.

If the optical fiber cable 4 is thus extracted from the optical communication apparatus 2, only the impedance 13 (Z1) of the output-side conducting circuit 7 is connected to the monitor 15.

Therefore, when the monitor 15 is monitoring the resistance value as the state of conduction of the detection circuit 9 if the optical fiber cable 4 is extracted from the optical communication apparatus 2, the monitor 15 detects an increase in resistance value. Alternatively, when the monitor 15 is monitoring a voltage value, it detects an increase in voltage value and, when it is monitoring a current value, it detects a decrease in current value. The following description is made on the assumption that the monitor 15 is monitoring the resistance value of the detection circuit 9.

If the optical fiber cable 4 is extracted from the optical communication apparatus 3 as shown in FIG. 6B, the plug 10b comes off from the jack 12, so that the terminal 8a on the side of the jack 12 is separated from the terminal 5b on the side of the plug 10b and the terminal 8b on the side of the jack 12 is separated from the terminal 6b on the side of the plug 10b.

As a result, the input-side conducting circuit 8 is electrically cut off from the conducting wires 5 and 6. That is, as in the case where the optical fiber cable 4 is extracted from the optical communication apparatus 2, the output-side conducting circuit 7 and the input-side conducting circuit 8 are electrically cut off from each other.

Accordingly, also if the optical fiber cable 4 is extracted from the optical communication apparatus 3, only the impedance 13 (Z1) of the output-side conducting circuit 7 is connected to the monitor 15. Therefore, also if the optical fiber cable 4 is extracted from the optical communication apparatus 3, the monitor 15 detects an increase in resistance value.

Further, if the optical fiber cable 4 is broken as shown in FIG. 6C, the conducting wires 5 and 6 are both cut, so that the output-side conducting circuit 7 and the input-side conducting circuit 8 are electrically cut off from each other.

Therefore, also if the optical fiber cable 4 is broken, only the impedance 13 (Z1) of the output-side conducting circuit 7 is connected to the monitor 15. Therefore, also if the optical fiber cable 4 is broken, the monitor 15 detects an increase in resistance value.

If the monitor 15 detects a change in state of conduction or an increase in, for example, resistance value of the detection circuit 9, the output control portion 17 decides that the optical fiber cable 4 is extracted or broken and so controls operation of the laser diode 16 to stop emission of light therefrom. Alternatively, it controls operation of the laser diode 16 to suppresses the quantity of light emitted from the laser diode 16 to within a safety standard limit (e.g., class 1) for laser.

As described above, in the optical communication system 1 of the first embodiment, constituting the detection circuit 9 by interconnecting the output-side conducting circuit 7 provided in the optical communication apparatus 2 and the input-side conducting circuit 8 provided in the optical communication apparatus 3 through the conducting wires 5 and 6 provided on the optical fiber cable 4 allows not only the extraction of optical fiber cable 4 from any one of the optical communication apparatus 2 provided with the monitor 15 and the optical communication apparatus 3 but also a break in the optical fiber cable 4 to be detected.

Therefore, if the optical fiber cable 4 is extracted from the optical communication apparatus 2 or 3 or if the optical fiber cable 4 is broken, it is possible to stop emission of light from the laser diode 16 or suppress the quantity of light emitted from the laser diode 16 to a value not larger than a predetermined value. This prevents laser light from leaking out of the optical communication apparatus from which the optical fiber cable 4 is extracted or the broken optical fiber cable 4, thereby improving safety. It is also possible to reduce power consumption by, for example, stopping emission of light from the laser diode 16 if communication is disabled.

Figure 7:
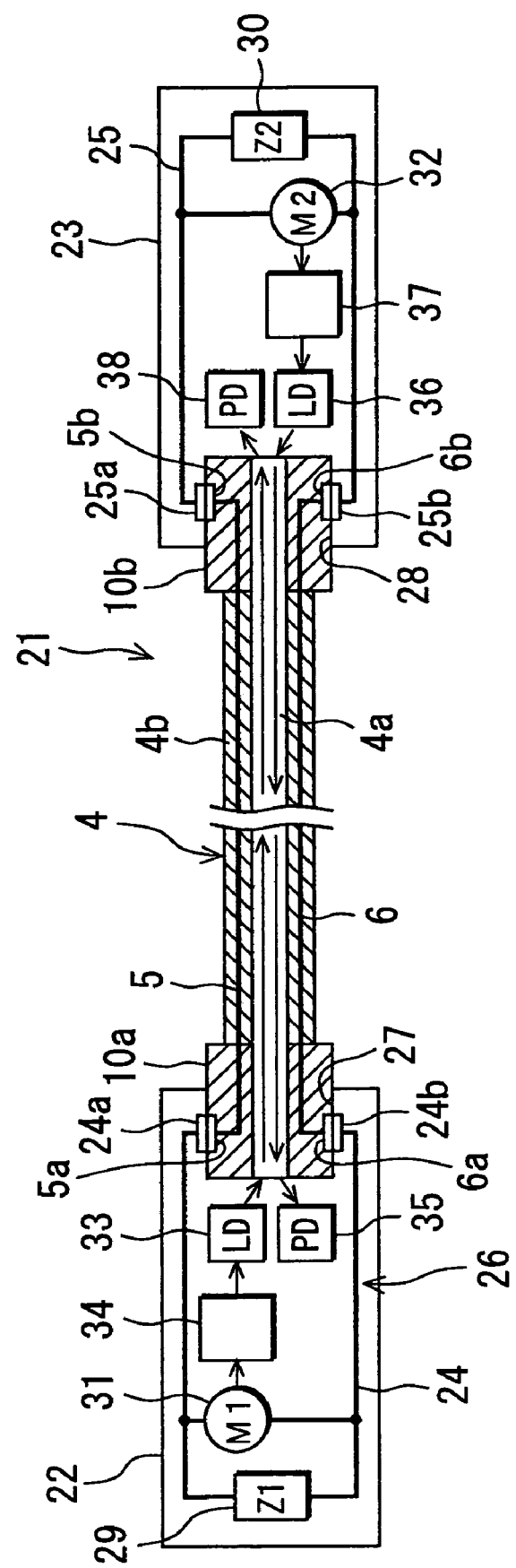
FIG. 7 is a conceptual diagram for showing a configuration of an optical communication system according to a second embodiment of the invention.
Figure 8:
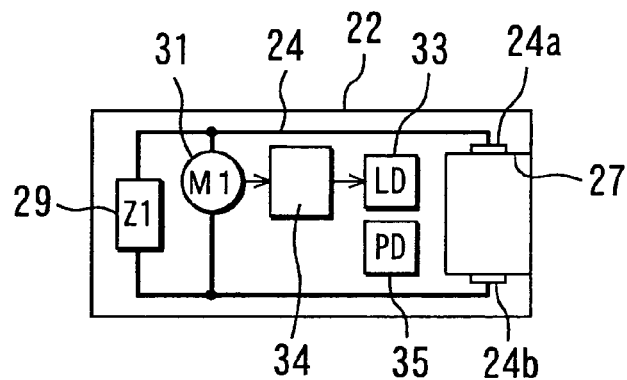
FIG. 8 is a conceptual diagram for showing an optical communication apparatus that constitutes the optical communication system of the second embodiment of the invention.

The following will describe an optical communication system of a second embodiment of the invention. FIG. 7 is a conceptual diagram for showing a configuration of an optical communication system according to the second embodiment. FIG. 8 is a conceptual diagram for showing a configuration of an optical communication apparatus that constitutes the optical communication system of the second embodiment.

An optical communication system 21 of the second embodiment has such a configuration that an optical communication apparatus 22 and the other optical communication apparatus 23 are coupled to each other through an optical fiber cable 4, to realize a single-core bi-directional optical communication. Although the optical communication apparatus 22 is shown in FIG. 8, the optical communication apparatus 23 has the same configuration.

The optical fiber cable 4 has the same configuration as that described concerning the optical communication system 1 of the first embodiment in that one optical fiber core 4*a* through which an optical signal is propagated is covered by a coating 4*b*. The optical fiber cable 4 has two conducting wires 5 and 6 along this optical fiber core 4*a*. The wires electrically interconnect the optical communication apparatuses 22 and 23 coupled to each other through the optical fiber cable 4.

The optical communication apparatus 22 comprises an output-side conducting circuit 24 connected to the conducting wires 5 and 6. The optical communication apparatus 23, on the other hand, comprises an output-side conducting circuit 25 connected to the conducting wires 5 and 6. The output-side conducting circuit 24 and the output-side conducting circuit 25 constitute the internal conductor. The output-side conducting circuits 24 and 25 are combined with the conducting wires 5 and 6 to constitute a detection circuit 26 as shown in FIG. 7.

As described with the optical communication system of the first embodiment, the optical fiber cable 4 is provided with a plug 10*a* at its one end and with a plug 10*b* at its other end. The following description is made on the assumption that the plug 10*a* is connected to the optical communication apparatus 22 and the plug 10*b* is connected to the optical communication apparatus 23.

The optical communication apparatus 22 comprises a jack 27 which the plug 10*a* is inserted into and extracted from as shown in FIG. 8, while similarly the optical communication apparatus 23 comprises a jack 28 which the plug 10*b* is inserted into and extracted from. This gives such a configuration that the optical fiber cable 4 can be attached to and detached from each of the optical communication apparatuses 22 and 23.

The jack 27 of the optical communication apparatus 22 comprises one terminal 24*a* and the other terminal 24*b* of the output-side conducting circuit 24. Similarly, the jack 28 of the optical communication apparatus 23 comprises one terminal 25*a* and the other terminal 25*b* of the output-side conducting circuit 25.

In this configuration, by inserting the one plug 10*a* of the optical fiber cable 4 into the jack 27 of the optical communication apparatus 22, the terminal 24*a* on the side of the jack 27 comes in contact with the terminal 5*a* on the side of the plug 10*a* and the terminal 24*b* on the side of the jack 27 comes in contact with the terminal 6*a* on the side of the plug 10*a*, so that the output-side conducting circuit 24 in the optical communication apparatus 22 is electrically connected to the conducting wires 5 and 6.

Further, by inserting the other plug 10*b* of the optical fiber cable 4 into the jack 28 of the optical communication apparatus 23, the terminal 25*a* on the side of the jack 28 comes in contact with the terminal 5*b* on the side of the plug 10*b* and the terminal 25*b* on the side of the jack 28 comes in contact with the terminal 6*b* on the side of the plug 10*b*, so that the output-side conducting circuit 25 in the optical communication apparatus 23 is electrically connected to the conducting wires 5 and 6.

By thus inserting the one plug 10*a* of the optical fiber cable 4 into the jack 27 of the optical communication apparatus 22 and the other plug 10*b* of the optical fiber cable 4 into the jack 28 of the optical communication apparatus 23, each of the output-side conducting circuits 24 and 25 is connected to the conducting wires 5 and 6, thereby constituting the detection circuit 26.

This detection circuit 26 can detect an extraction of the optical fiber cable 4 or a break in the optical fiber cable 4 because it is also arranged to vary, for example, in circuit resistance if the optical fiber cable 4 is extracted from the optical communication apparatus 22 or the optical communication apparatus 23 or if the optical fiber cable 4 is broken.

For example, the output-side conducting circuit 24 is provided with a power supply, not shown, as well as an impedance 29 having an arbitrary resistance value (Z1). Similarly, the output-side conducting circuit 25 is provided with a power supply, now shown, as well as an impedance 30 having an arbitrary resistance value (Z2). The detection circuit 26 has such a configuration that the impedances 29 and 30 are connected in parallel. Further, the output-side conducting circuit 24 is provided with a monitor 31 and the output-side conducting circuit 25 is provided with a monitor 32. The monitors 31 and 32 measure, for example, a resistance value of the detection circuit 26.

The optical communication apparatus 22 comprises a laser diode 33 as opposed to the optical fiber cable 4 where it is coupled to the jack 27. This laser diode 33 constitutes a light emitter and emits signal light, which impinges on the optical fiber cable 4.

Further, the optical communication apparatus 22 comprises a drive circuit, not shown, for driving the laser diode 33 and an output control portion 34 for controlling this drive circuit to control emission of light from the laser diode 33. The output control portion 34 constitutes a controller and controls output of the laser diode 33 if the monitor 31, which is monitoring a state of conduction of the detection circuit 26, detects a change, for example, in resistance value of the detection circuit 26.

The optical communication apparatus 22 further comprises a photodiode 35 as opposed to the optical fiber cable 4 where it is coupled to the jack 27. This photodiode 35 constitutes a light receiver and receives signal light launched from the optical fiber cable 4. Although not detailed, the optical communication apparatus 22 incorporates a mechanism for making signal light emitted from the laser diode 33 incident upon the optical fiber core 4*a* of the optical fiber cable 4 and making signal light launched from the optical fiber core 4*a* of the optical fiber cable 4 incident upon the photodiode 35.

Similarly, the optical communication apparatus 23 comprises a laser diode 36 as opposed to the optical fiber cable 4 where it is coupled to the jack 28. This laser diode 36 constitutes the light emitter and emits signal light, which impinges on the optical fiber cable 4.

Further, the optical communication apparatus 23 comprises a drive circuit, not shown, for driving the laser diode 36 and an output control portion 37 for controlling this drive circuit to control emission of light from the laser diode 36. The output control portion 37 constitutes the controller and controls output power of the laser diode 36 if the monitor 32, which is monitoring the state of conduction of the detection circuit 26, detects a change, for example, in resistance value of the detection circuit 26.

The optical communication apparatus 23 further comprises a photodiode 38 as opposed to the optical fiber cable 4 where it is coupled to the jack 28. This photodiode 38 constitutes the light receiver and receives signal light launched from the optical fiber cable 4. Although not detailed, the optical communication apparatus 23 also incorporates a mechanism for making signal light emitted from the laser diode 36 incident upon the optical fiber core 4*a* of the optical fiber cable 4 and making signal light launched from the optical fiber core 4a of the optical fiber cable 4 incident upon the photodiode 38.

FIGS. 9A–9C are conceptual diagrams each for showing operations of the optical communication system of the second embodiment of the invention. The following will describe the operations of the optical communication system 21 of the second embodiment. First, as shown in FIG. 7, the one plug 10a of the optical fiber cable 4 is inserted into the jack 27 of the optical communication apparatus 22 and the other plug 10b of the optical fiber cable 4 is inserted into the jack 28 of the optical communication apparatus 23.

This gives such a configuration of the optical communication system 21 that the optical communication apparatuses 22 and 23 are coupled to each other through the optical fiber cable 4.

In the optical communication system 21, when the optical communication apparatus 22 receives an electric signal, the laser diode 33 converts this electric signal into signal light and emits it. The signal light emitted from the laser diode 33 in the optical communication apparatus 22 impinges on the one end of the optical fiber core 4a of the optical fiber cable 4. After having entered the optical fiber core 4a, the signal light is propagated through this optical fiber core 4a and launched from it at the other end thereof. The signal light launched from the other end of the optical fiber core 4a impinges on the photodiode 38 in the optical communication apparatus 23. Then, the photodiode 38 converts the signal light into an electric signal and outputs it to an outside of the optical communication apparatus 23.

When the optical communication apparatus 23 receives an electric signal, the laser diode 36 converts this electric signal into signal light and emits it. The signal light emitted from the laser diode 36 in the optical communication apparatus 23 impinges on the other end of the optical fiber core 4a of the optical fiber cable 4. After having entered the optical fiber core 4a, the signal light is propagated through this optical fiber core 4a and launched from the one end thereof. The signal light launched from the one end of the optical fiber core 4a is made incident upon the photodiode 35 in the optical communication apparatus 22. Then, the photodiode 35 converts the signal light into an electric signal and outputs it to the outside of the optical communication apparatus 22.

In such a manner, single-core bi-directional optical communication between the optical communication apparatuses 22 and 23 is realized in the optical communication system 21 of the second embodiment.

In this optical communication system 21, each of the output-side conducting circuit 24 in the optical communication apparatus 22 and the output-side conducting circuit 25 in the optical communication apparatus 23 is connected to the conducting wires 5 and 6 of the optical fiber cable 4, thereby constituting the detection circuit 26.

In this configuration, in the optical communication apparatus 22, the monitor 31 provided to the output-side conducting circuit 24 monitors the state of conduction of this detection circuit 26 and the output control portion 34 controls emission of light from the laser diode 33. Similarly, in the optical communication apparatus 23, the monitor 32 provided to the output-side conducting circuit 25 monitors the state of conduction of the detection circuit 26 and the output control portion 37 controls emission of light from the laser diode 36.

Since the output-side conducting circuits 24 and 25 are connected to each other through the conducting wires 5 and 6, both of the impedances 29 and 30 are connected to the monitor 31 provided on the side of the optical communication apparatus 22. Further, both of the impedances 29 and 30 are connected also to the monitor 32 provided on the side of the optical communication apparatus 23.

As can be seen from the above, in a condition where the optical communication apparatuses 22 and 23 are normally coupled to each other through the optical fiber cable 4, the output-side conducting circuits 24 and 25 are connected to each other, so that the resistance value of the detection circuit 26 becomes a parallel-connection resistance value of the impedance 29 (Z1) and the impedance 30 (Z2).

Accordingly, the monitor 31 recognizes the case where the resistance value of the detection circuit 26 is a parallel-connection resistance value of the impedance 29 (Z1) and the impedance 30 (Z2) as a normal state of conduction of the detection circuit 26. It is to be noted that a case where a voltage or current value of the detection circuit 26 corresponds to this parallel-connection resistance value may be recognized as the normal state of conduction of the detection circuit 26.

Further, the monitor 32 also recognizes the case where the resistance value of the detection circuit 26 is a parallel-connection resistance value of the impedance 29 (Z1) and the impedance 30 (Z2) as the normal state of conduction of the detection circuit 26.

If the optical fiber cable 4 is extracted from the optical communication apparatus 22 as shown in FIG. 9A, the plug 10a comes off from the jack 27, so that the terminal 24a on the side of the jack 27 is separated from the terminal 5a on the side of the plug 10a and the terminal 24b on the side of the jack 27 is separated from the terminal 6a on the side of the plug 10a.

As a result, the output-side conducting circuit 24 is electrically cut off from the conducting wires 5 and 6. That is, the output-side conducting circuits 24 and 25 are electrically cut off from each other.

In such a manner, if the optical fiber cable 4 is extracted from the optical communication apparatus 22, only the impedance 29 (Z1) of the output-side conducting circuit 24 is connected to the monitor 31. Therefore, in the optical communication apparatus 22, the monitor 31 detects an increase in resistance value.

Accordingly, in the optical communication apparatus 22, the output control portion 34 controls operations of the laser diode 33 to stop emission of light therefrom. Alternatively, it controls operations of the laser diode 33 to suppress a quantity of light emitted from the laser diode 33 to a value not larger than a predetermined value.

Further, if the optical fiber cable 4 is extracted from the optical communication apparatus 22, the output-side conducting circuits 24 and 25 are cut off from each other electrically, so that only the impedance 30 (Z2) of the output-side conducting circuit 25 is connected to the monitor 32 in the optical communication apparatus 23. Therefore, if the optical fiber cable 4 is extracted from the optical communication apparatus 22, the monitor 32 detects an increase in resistance value in the optical communication apparatus 23.

Accordingly, in the optical communication apparatus 23 also, the output control portion 37 controls operations of the laser diode 36 to stop emission of light therefrom. Alternatively, it controls operations of the laser diode 36 to suppress a quantity of light emitted from the laser diode 36 to a value not larger than a predetermined value.

In such a manner, in the optical communication system 21 of the second embodiment for performing single-core bi-directional optical communication, if the optical fiber cable 4 is extracted from the one optical communication apparatus 22, it is possible not only to, for example, stop emission of light from the laser diode 33 in the optical communication apparatus 22 from which the optical fiber cable 4 is extracted, but also to stop emission of light from the laser diode 36 in the other optical communication apparatus 23.

Also if the optical fiber cable 4 is extracted from the optical communication apparatus 23 as shown in FIG. 9B, similar control is conducted. That is, if the optical fiber cable 4 is extracted from the optical communication apparatus 23, the plug 10b comes off from the jack 28, so that the terminal 25a on the side of the jack 28 is separated from the terminal 5b on the side of the plug 10b and the terminal 25b on the side of the jack 28 is separated from the terminal 6b on the side of the plug 10b.

As a result, the output-side conducting circuit 25 is electrically cut off from the conducting wires 5 and 6, so that the output-side conducting circuits 24 and 25 are cut off from each other electrically.

In such a manner, if the optical fiber cable 4 is extracted from the optical communication apparatus 23, only the impedance 30 (Z2) of the output-side conducting circuit 25 is connected to the monitor 32 in the optical communication apparatus 23. Therefore, in the optical communication apparatus 23, the monitor 32 detects an increase in resistance value.

Accordingly, in the optical communication apparatus 23, the output control portion 37 controls operations of the laser diode 36 to stop emission of light therefrom. Alternatively, it controls operations of the laser diode 36 to suppress the quantity of light transmitted from the laser diode 36 to the value not larger than the predetermined value.

Further, if the optical fiber cable 4 is extracted from the optical communication apparatus 23, the output-side conducting circuits 24 and 25 are cut off from each other electrically, so that only the impedance 29 (Z1) of the output-side conducting circuit 24 is connected to the monitor 31 in the optical communication apparatus 22. Therefore, the monitor 31 also in the optical communication apparatus 22 detects an increase in resistance value.

Accordingly, in the optical communication apparatus 22, the output control portion 34 controls operations of the laser diode 33 to stop emission of light therefrom. Alternatively, it controls operations of the laser diode 33 to suppress the quantity of light emitted from the laser diode 33 to the value not larger than the predetermined value.

In such a manner, if the optical fiber cable 4 is extracted from the other optical communication apparatus 23, it is possible not only to, for example, stop emission of light from the laser diode 36 in the optical communication apparatus 23 from which the optical fiber cable 4 is extracted, but also to stop emission of light from the laser diode 33 in the one optical communication apparatus 22.

Further, if the optical fiber cable 4 is broken as shown in FIG. 9C, the conducting wires 5 and 6 are both cut, so that the output-side conducting circuits 24 and 25 are electrically cut off from each other.

Accordingly, also if the optical fiber cable 4 is broken, only the impedance 29 (Z1) of the output-side conducting circuit 24 is connected to the monitor 31 in the optical communication apparatus 22, so that the monitor 31 detects an increase in resistance value. Further, only the impedance 30 (Z2) of the output-side conducting circuit 25 is connected to the monitor 32 in the optical communication apparatus 23, so that the monitor 32 detects an increase in resistance value.

Accordingly, in the optical communication apparatus 22, the output control portion 34 controls operations of the laser diode 33 to stop emission of light therefrom. Alternatively, it controls operations of the laser diode 33 to suppress the quantity of light emitted from the laser diode 33 to a value not larger than a predetermined value. Further, in the optical communication apparatus 23, the output control portion 37 controls operations of the laser diode 36 to stop emission of light therefrom. Alternatively, it controls operations of the laser diode 36 to suppress the quantity of light emitted from the diode 36 to the value not larger than the predetermined value.

As described above, in the optical communication system 21 of the second embodiment, it is possible to stop emission of light from the laser diode 33 in the optical communication apparatus 22 or suppress the quantity of light emitted from it in all of the cases where the optical fiber cable 4 is extracted from the optical communication apparatus 22, where the optical fiber cable 4 is extracted from the optical communication apparatus 23, and where the optical fiber cable 4 is broken. It is also possible to stop emission of light from the laser diode 36 in the optical communication apparatus 23 or suppress the quantity of light emitted from it.

Accordingly, if the optical fiber cable 4 is extracted or broken in an optical communication system for performing single-core bi-directional optical communication, the optical communication system 21 prevents laser light from leaking out of an optical communication apparatus from which the optical fiber cable 4 is extracted or the broken optical fiber cable 4, thereby improving safety. Also, if communication is disabled, the laser diodes 33 and 36 are, for example, stopped from emitting light, thereby reducing power consumption.

Figure 11:
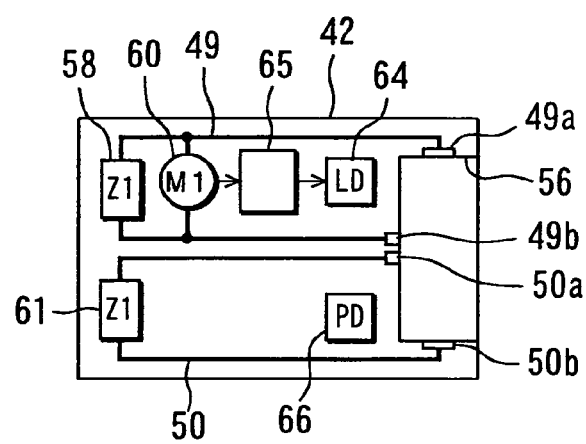
FIG. 11 is a conceptual diagram for showing a configuration of an optical communication apparatus that constitutes the optical communication system of the third embodiment of the invention.
Figure 12:
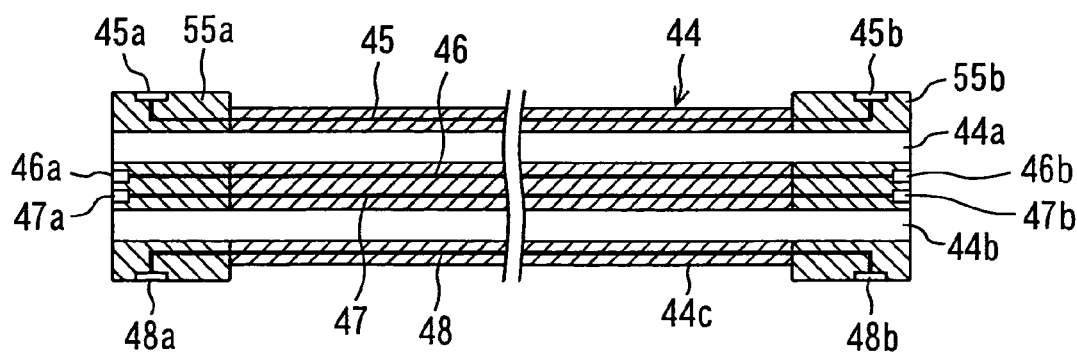
FIG. 12 is a conceptual diagram for showing a configuration of an optical fiber cable that constitutes the optical communication system of the third embodiment of the invention.
Figure 10:
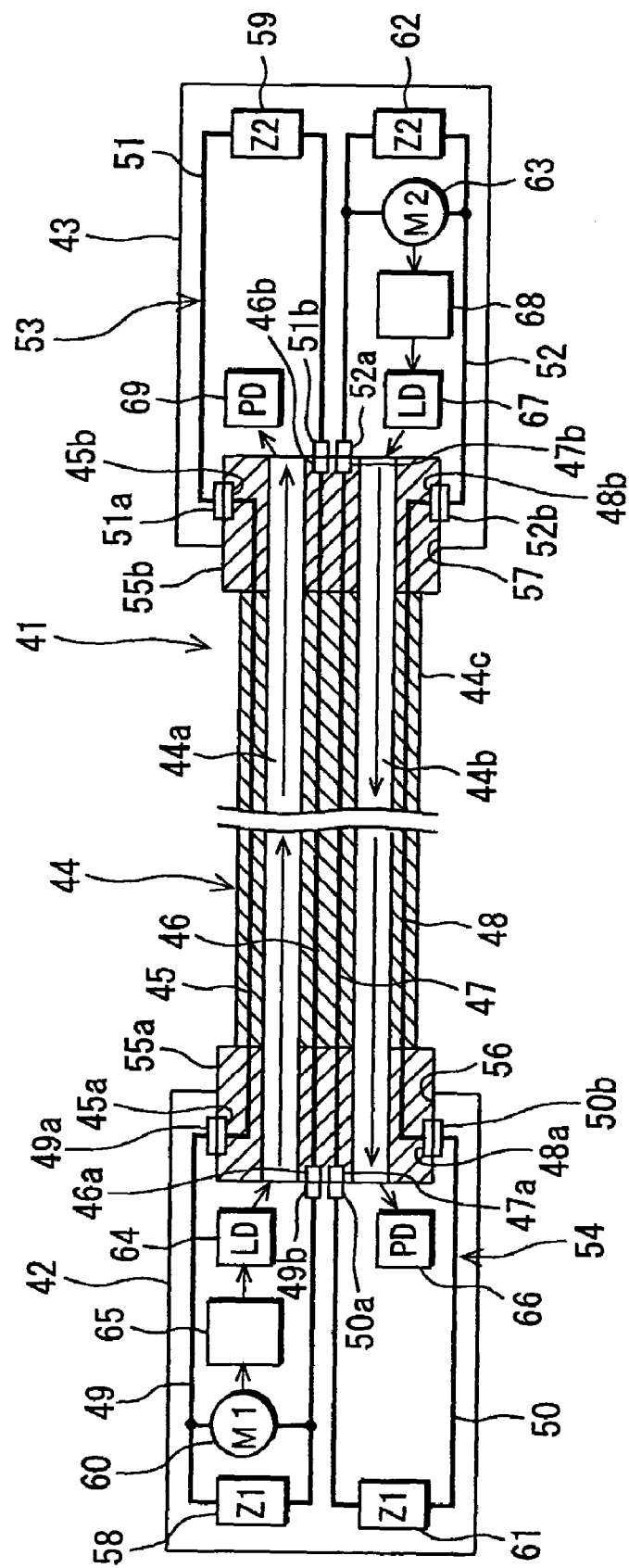
FIG. 10 is a conceptual diagram for showing a configuration of an optical communication system according to a third embodiment of the invention.

The following will describe a third embodiment of an optical communication system according to the invention. FIG. 10 is a conceptual diagram for showing a configuration of an optical communication system according to the third embodiment. FIG. 11 is a conceptual diagram for showing a configuration of an optical communication apparatus that constitutes the optical communication system of the third embodiment. FIG. 12 is a conceptual diagram for showing a configuration of an optical fiber cable that constitutes the optical communication system of the third embodiment.

An optical communication system 41 of the third embodiment has such a configuration that an optical communication apparatus 42 and an optical communication apparatus 43 are coupled to each other through an optical fiber cable 44, to realize a multi-core bi-directional optical communication. Although the optical communication apparatus 42 is shown in FIG. 11, the optical communication apparatus 43 has the same configuration as that of the optical communication apparatus 42.

The optical fiber cable 44 is one example of an optical cable and, as shown in FIG. 12, has a configuration that a coating 44c covers two optical fiber cores 44a and 44b through which an optical signal is propagated. The optical fiber cable 44 includes four conducting wires 45, 46, 47, and 48 along these optical fiber cores 44a and 44b. The conducting wires 45, 46, 47, and 48 constitute the inter-apparatus conductor and electrically interconnect the optical communication apparatuses 42 and 43 coupled to each other by the optical fiber cable 44.

The optical communication apparatus 42 comprises an output-side conducting circuit 49 connected to the conducting wires 45 and 46 and an input-side conducting circuit 50 connected to the conducting wires 47 and 48. The optical communication apparatus 43 also has a configuration similar to that of the optical communication apparatus 42 in that it comprises an input-side conducting circuit 51 connected to the conducting wires 45 and 46 and an output-side conducting circuit 52 connected to the conducting wires 47 and 48.

The output-side conducting circuit 49 and the input-side conducting circuit 50 as well as the output-side conducting circuit 51 and the input-side conducting circuit 52 constitute the internal conductor. The output-side conducting circuit 49, the input-side conducting circuit 51, and the conducting wires 45 and 46 are combined to constitute a first detection circuit 53. Further, the output-side conducting circuit 52, the input-side conducting circuit 50, and the conducting wires 47 and 48 are combined to constitute a second detection circuit 54.

The optical fiber cable 44 is attached to and detached from each of the optical communication apparatuses 42 and 43. When the optical communication apparatuses 42 and 43 are coupled to each other through the optical fiber cable 44, the first detection circuit 53 and the second detection circuit 54 are constituted.

Specifically, the optical fiber cable 44 is provided with a plug 55a at its one end and with a plug 55b at its other end. These plugs 55a and 55b constitute the attachment. The following description is made on the assumption that the plug 55a is connected to the optical communication apparatus 42 and the plug 55b, to the optical communication apparatus 43.

The optical communication apparatus 42 comprises a jack 56 which the plug 55a is inserted into and extracted from as shown in FIG. 11. Similarly the optical communication apparatus 43 comprises a jack 57 which the plug 55b is inserted into and extracted from as shown in FIG. 10. This gives such a configuration that the optical fiber cable 44 can be attached to and detached from each of the optical communication apparatuses 42 and 43.

The one plug 55a of the optical fiber cable 44 comprises one terminal 45a of the conducting wire 45, one terminal 46a of the conducting wire 46, one terminal 47a of the conducting wire 47, and one terminal 48a of the conducting wire 48, as shown in FIG. 12. The other plug 55b, on the other hand, comprises the other terminal 45b of the conducting wire 45, the other terminal 46b of the conducting wire 46, the other terminal 47b of the conducting wire 47, and the other terminal 48b of the conducting wire 48.

The jack 56 of the optical communication apparatus 42 comprises one terminal 49a and the other terminal 49b of the output-side conducting circuit 49. The jack 56, on the other hand, comprises one terminal 50a and the other terminal 50b of the input-side conducting circuit 50. Similarly, the jack 57 of the optical communication apparatus 43 comprises one terminal 51a and the other terminal 51b of the input-side conducting circuit 51, as shown in FIG. 10. Further, the jack 57 comprises one terminal 52a and the other terminal 52b of the output-side conducting circuit 52.

In this configuration, by inserting the one plug 55a of the optical fiber cable 44 into the jack 56 of the optical communication apparatus 42, the terminal 49a on the side of the jack 56 comes in contact with the terminal 45a on the side of the plug 55a and the terminal 49b on the side of the jack 56 comes in contact with the terminal 46a on the side of the plug 55a, so that the output-side conducting circuit 49 in the optical communication apparatus 42 is electrically connected to the conducting wires 45 and 46.

Further, the terminal 50a on the side of the jack 56 comes in contact with the terminal 47a on the side of the plug 55a and the terminal 50b on the side of the jack 56 comes in contact with the terminal 48a on the side of the plug 55a, so that the input-side conducting circuit 50 in the optical communication apparatus 42 is electrically connected to the conducting wires 47 and 48.

By inserting the other plug 55b of the optical fiber cable 44 into the jack 57 of the optical communication apparatus 43, the terminal 51a on the side of the jack 57 comes in contact with the terminal 45b on the side of the plug 55b and the terminal 51b on the side of the jack 57 comes in contact with the terminal 46b on the side of the plug 55b, so that the input-side conducting circuit 51 in the optical communication apparatus 43 is electrically connected to the conducting wires 45 and 46.

Further, the terminal 52a on the side of the jack 57 comes in contact with the terminal 47b on the side of the plug 55b and the terminal 52b on the side of the jack 57 comes in contact with the terminal 48b on the side of the plug 55b, so that the output-side conducting circuit 52 in the optical communication apparatus 43 is electrically connected to the conducting wires 47 and 48.

By thus inserting the one plug 55a of the optical fiber cable 44 into the jack 56 of the optical communication apparatus 42 and the other plug 55b of the optical fiber cable 44 into the jack 57 of the optical communication apparatus 43, each of the output-side conducting circuit 49 provided to the optical communication apparatus 42 and the input-side conducting circuit 51 provided to the optical communication apparatus 43 is connected to the conducting wires 45 and 46 provided to the optical fiber cable 44, thereby constituting the first detection circuit 53.

Further, each of the input-side conducting circuit 50 provided to the optical communication apparatus 42 and the output-side conducting circuit 52 provided to the optical communication apparatus 43 is connected to the conducting wires 47 and 48 provided to the optical fiber cable 44, thereby constituting the second detection circuit 54.

The first detection circuit 53 and the second detection circuit 54 detect extraction or breakage of the optical fiber cable 44 because they are each arranged to vary, for example, in circuit resistance if the optical fiber cable 44 is extracted from the optical communication apparatus 42 or 43 or if the optical fiber cable 44 is broken.

The first detection circuit 53 is arranged, for example, to have a power supply, not shown, provided in the output-side conducting circuit 49 and an impedance 58 having an arbitrary resistance value (Z1). The input-side conducting circuit 51 is provided with an impedance 59 having an arbitrary resistance value (Z2). The first detection circuit 53 has such a configuration that the impedances 58 and 59 are connected in parallel. Further, the output-side conducting circuit 49 is provided with a monitor 60. The monitor 60 measures, for example, a resistance value of the detection circuit 53.

The second detection circuit 54 is arranged, for example, to have an impedance 61 having the arbitrary resistance value (Z1) provided to the input-side conducting circuit 50. The output-side conducting circuit 52 is provided with a power supply, not shown, and an impedance 62 having the arbitrary resistance value (Z2). The second detection circuit 54 has such a configuration that the impedances 61 and 62 are connected in parallel. Further, the output-side conducting circuit 52 is provided with a monitor 63. The monitor 63 measures, for example, a resistance value of the second detection circuit 54.

The optical communication apparatus 42 comprises a laser diode 64 as opposed to the optical fiber core 44a of the optical fiber 44 coupled to the jack 56. This laser diode 64 constitutes the light emitter and emits signal light, which enters the optical fiber core 44a of the optical fiber cable 44.

Further, the optical communication apparatus 42 comprises a drive circuit, not shown, for driving a laser diode 64 and an output control portion 65 for controlling this drive circuit to control emission of light from the laser diode 64. The output control portion 65 constitutes the controller and controls output power of the laser diode 64 if the monitor 60, which monitors a state of conduction of the first detection circuit 53, detects a change, for example, in resistance value of the first detection circuit 53.

The optical communication apparatus 42 further comprises a photodiode 66 as opposed to the optical fiber core 44b of the optical fiber cable 44 coupled to the jack 56. This photodiode 66 constitutes the light receiver and receives signal light launched from the optical fiber core 44b of the optical fiber cable 44.

Similarly, the optical communication apparatus 43 comprises a laser diode 67 as opposed to the optical fiber core 44b of the optical fiber cable 44 coupled to the jack 57. This laser diode 67 constitutes the light emitter and emits signal light, which enters the optical fiber core 44b of the optical fiber cable 44.

Further, the optical communication apparatus 43 comprises a drive circuit, not shown, for driving the laser diode 67 and an output control portion 68 for controlling this drive circuit to control emission of light from the laser diode 67. The output control portion 68 constitutes the controller and controls output power of the laser diode 67 if the monitor 63, which monitors a state of conduction of the second detection circuit 54, detects a change, for example, in resistance value of the second detection circuit 54.

The optical communication apparatus 43 further comprises a photodiode 69 as opposed to the optical fiber core 44a of the optical fiber cable 44 coupled to the jack 57. This photodiode 69 constitutes the light receiver and receives signal light launched from the optical fiber core 44a of the optical fiber cable 44.

Figure 13A:
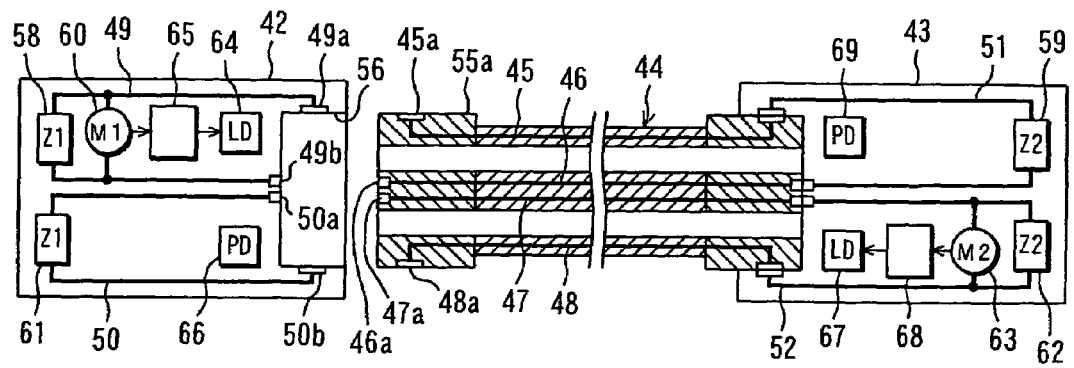
FIGS. 13A–13C are conceptual diagrams each for showing operations of the optical communication system of the third embodiment of the invention.
Figure 13B:
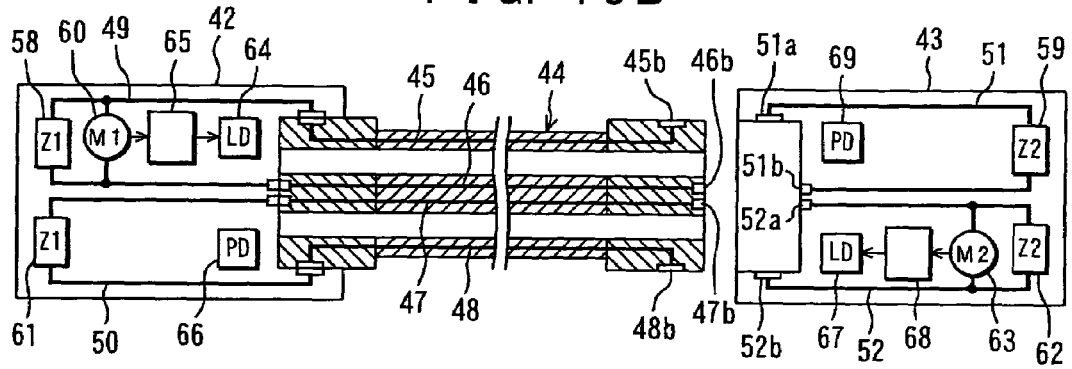
Figure 13C:
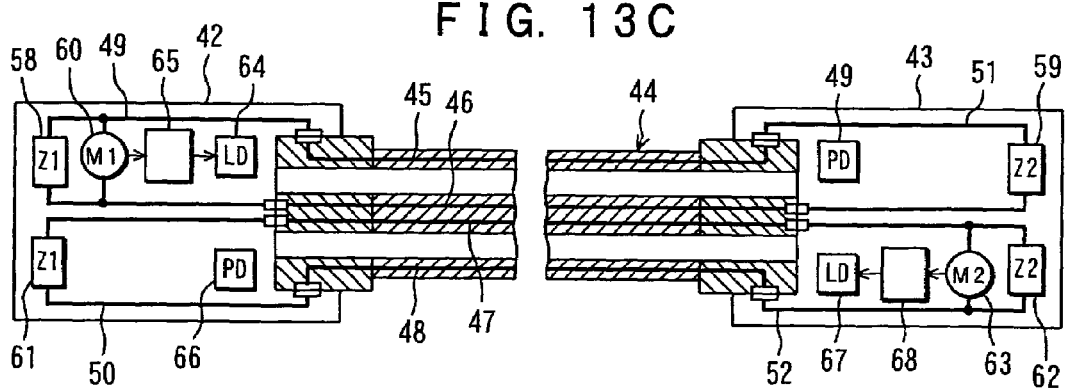

FIGS. 13A–13C are conceptual diagrams for showing operations of the optical communication system of the third embodiment. The following will describe the operations of the optical communication system 41 of the third embodiment with reference to the drawings. First, as shown in FIG. 10, the one plug 55a of the optical fiber cable 44 is inserted into the jack 56 of the optical communication apparatus 42 and the other plug 55b of the optical fiber cable 44 is inserted into the jack 57 of the optical communication apparatus 43. This gives such a configuration of the optical communication system 41 that the optical communication apparatuses 42 and 43 are coupled to each other through the optical fiber cable 44.

In the optical communication system 41, when the optical communication apparatus 42 receives an electric signal, the laser diode 64 converts this electric signal into signal light and emits it. The signal light emitted from the laser diode 64 in the optical communication apparatus 42 impinges on the one end of the optical fiber core 44a of the optical fiber cable 44. After having entered the optical fiber core 44a, the signal light is propagated through this optical fiber core 44a and launched from the other end thereof. The signal light launched from the other end of the optical fiber core 44a impinges on the photodiode 69 in the optical communication apparatus 43. Then, the photodiode 69 converts the signal light into an electric signal and outputs it to an outside of the optical communication apparatus 43.

When the optical communication apparatus 43 receives an electric signal, the laser diode 67 converts this electric signal into signal light and emits it. The signal light emitted from the laser diode 67 in the optical communication apparatus 43 impinges on the other end of the optical fiber core 44b of the optical fiber cable 44. After having entered the optical fiber core 44b, the signal light is propagated through this optical fiber core 44b and launched from the one end thereof. The signal light launched from the one end of the optical fiber core 44b impinges on the photodiode 66 in the optical communication apparatus 42. Then, the photodiode 66 converts the signal light into an electric signal and outputs it to the outside of the optical communication apparatus 42.

In such a manner, multi-core bi-directional optical communication between the optical communication apparatuses 42 and 43 is realized in the optical communication system 41 of the third embodiment.

In this optical communication system 41, each of the output-side conducting circuit 49 in the optical communication apparatus 42 and the input-side conducting circuit 51 in the optical communication apparatus 43 is connected to the conducting wires 45 and 46 of the optical fiber cable 44, thereby constituting the first detection circuit 53. Further, each of the input-side conducting circuit 50 in the optical communication apparatus 42 and the output-side conducting circuit 52 in the optical communication apparatus 43 is connected to the conducting wires 47 and 48 of the optical fiber cable 44, thereby constituting the second detection circuit 54.

In this configuration, the monitor 60 provided to the output-side conducting circuit 49 of the optical communication apparatus 42 monitors the state of conduction of the first detection circuit 53, and the output control portion 65 controls emission of light from the laser diode 64. Further, the monitor 63 provided to the output-side conducting circuit 52 in the optical communication apparatus 43 monitors the state of conduction of the second detection circuit 54 and the output control portion 68 controls emission of light from the laser diode 67.

Since the output-side conducting circuit 49 and the input-side conducting circuit 51 are connected to each other through the conducting wires 45 and 46 in the first detection circuit 53, both of the impedances 58 and 59 are connected to the monitor 60 provided to the optical communication apparatus 42.

As can be seen from the above, in a condition where the optical communication apparatuses 42 and 43 are normally coupled to each other through the optical fiber cable 44, the output-side conducting circuit 49 and the input-side conducting circuit 51 are connected to each other, so that the resistance value of the first detection circuit 53 becomes a parallel-connection resistance value of the impedance 58 (Z1) and the impedance 59 (Z2).

Accordingly, the monitor 60 recognizes the case where the resistance value of the first detection circuit 53 is a parallel-connection resistance value of the impedance 58 (Z1) and the impedance 59 (Z2) as a normal state of conduction of the first detection circuit 53. It is to be noted that a case where a voltage or current value of the first detection circuit 53 corresponds to this parallel-connection resistance value may be recognized as the normal state of conduction of the first detection circuit 53. The following description is made on the assumption that a resistance value is monitored.

Since the input-side conducting circuit 50 and the output-side conducting circuit 52 are connected to each other through the conducting wires 47 and 48 in the second detection circuit 54, both of the impedances 61 and 62 are connected to the monitor 63 provided to the optical communication apparatus 43.

As can be seen from the above, in a condition where the optical communication apparatuses 42 and 43 are normally coupled to each other through the optical fiber cable 44, the input-side conducting circuit 50 and the output-side conducting circuit 52 are connected to each other, so that the resistance value of the second detection circuit 54 becomes a parallel-connection resistance value of the impedance 61 (Z1) and the impedance 62 (Z2).

Accordingly, the monitor 63 recognizes the case where the resistance value of the second detection circuit 54 is a parallel-connection resistance value of the impedance 61 (Z1) and the impedance 62 (Z2) as a normal state of conduction of the second detection circuit 54.

If the optical fiber cable 44 is extracted from the optical communication apparatus 42 as shown in FIG. 13A, the plug 55a comes off from the jack 56, so that the terminal 49a on the side of the jack 56 is separated from the terminal 45a on the side of the plug 55a and the terminal 49b on the side of the jack 56 is separated from the terminal 46a on the side of the plug 55a.

As a result, the output-side conducting circuit 49 is electrically cut off from the conducting wires 45 and 46. That is, the output-side conducting circuit 49 and the input-side conducting circuit 51 are electrically cut off from each other.

Further, the plug 55a is extracted from the jack 56, so that the terminal 50a on the side of the jack 56 is separated from the terminal 47a on the side of the plug 55a and the terminal 50b on the side of the jack 56 is separated from the terminal 48a on the side of the plug 55a.

As a result, the input-side conducting circuit 50 is electrically cut off from the conducting wires 47 and 48. That is, the input-side conducting circuit 50 and the output-side conducting circuit 52 are electrically cut off from each other.

In such a manner, if the optical fiber 44 is extracted from the optical communication apparatus 42, only the impedance 58 (Z1) of the output-side conducting circuit 49 is connected to the monitor 60 provided to the optical communication apparatus 42. Therefore, in the optical communication apparatus 42, the monitor 60 detects an increase in resistance value.

Accordingly, in the optical communication apparatus 42, the output control portion 65 controls emission of light from the laser diode 64 to stop. Alternatively, it suppresses a quantity of light emitted from the laser diode 64 to a value not larger than a predetermined value.

Further, if the optical fiber 44 is extracted from the optical communication apparatus 42, only the impedance 62 (Z2) of the output-side conducting circuit 52 is connected to the monitor 63 provided to the optical communication apparatus 43. Therefore, in the optical communication apparatus 43, the monitor 63 detects an increase in resistance value.

Accordingly, in the optical communication apparatus 43, the output control portion 68 controls emission of light from the laser diode 67 to stop. Alternatively, it suppresses a quantity of light emitted from the laser diode 67 to a value not larger than a predetermined value.

In such a manner, in the optical communication system 41 of the third embodiment for performing multi-core bi-directional communication, if the optical fiber cable 44 is extracted from the one optical communication apparatus 42, it is possible not only to, for example, stop emission of light from the laser diode 64 in the optical communication apparatus 42 from which the optical fiber cable 44 is extracted but also to stop emission of light from the laser diode 67 in the other optical communication apparatus 43.

Also if the optical fiber cable 44 is extracted from the optical communication apparatus 43 as shown in FIG. 13B, similar control is conducted. That is, if the optical fiber cable 44 is extracted from the optical communication apparatus 43, the plug 55b comes off from the jack 57, so that the terminal 52a on the side of the jack 57 is separated from the terminal 47b on the side of the plug 55b and the terminal 52b on the side of the jack 57 is separated from the terminal 48b on the side of the plug 55b.

As a result, the output-side conducting circuit 52 is electrically cut off from the conducting wires 47 and 48, so that the output-side conducting circuit 52 and the input-side conducting circuit 50 are cut off from each other electrically.

Further, since the terminal 51a on the side of the jack 57 is separated from the terminal 45b on the side of the plug 55b and the terminal 51b on the side of the jack 57 is separated from the terminal 46b on the side of the plug 55b, the input-side conducting circuit 51 is electrically cut off from the conducting wires 45 and 46. As a result, the output-side conducting circuit 49 and the input-side conducting circuit 51 are cut off from each other electrically.

In such a manner, if the optical fiber cable 44 is extracted from the optical communication apparatus 43, only the impedance 62 (Z2) of the output-side conducting circuit 52 is connected to the monitor 63 in the optical communication apparatus 43. Therefore, in the optical communication apparatus 43, the monitor 63 detects an increase in resistance value.

Accordingly, in the optical communication apparatus 43, the output control portion 68 controls emission of light from the laser diode 67 to stop. Alternatively, it suppresses the quantity of light emitted from the laser diode 67 to the value not larger than the predetermined value.

Further, if the optical fiber cable 44 is extracted from the optical communication apparatus 43, the output-side conducting circuit 49 and the input-side conducting circuit 51 are cut off from each other electrically, so that only the impedance 58 (Z1) of the output-side conducting circuit 49 is connected to the monitor 60 in the optical communication apparatus 42. Therefore, the monitor 60 in the optical communication apparatus 22 also detects an increase in resistance value.

Accordingly, in the optical communication apparatus 42, the output control portion 65 controls emission of light from the laser diode 64 to stop. Alternatively, it suppresses the quantity of light emitted from the laser diode 64 to the value not larger than the predetermined value.

In such a manner, if the optical fiber cable 44 is extracted from the other optical communication apparatus 43, it is possible not only to, for example, stop emission of light from the laser diode 67 in the optical communication apparatus 43 from which the optical fiber cable 44 is extracted, but also to stop emission of light from the laser diode 64 in the one optical communication apparatus 42.

Further, if the optical fiber cable 44 is broken as shown in FIG. 13C, the conducting wires 45, 46, 47 and 48 are cut, so that the output-side conducting circuit 49 and the input-side conducting circuit 51 are electrically cut off from each other and the output-side conducting circuit 52 and the input-side conducting circuit 50 are electrically cut off from each other.

Accordingly, also if the optical fiber 44 is broken, only the impedance 58 (Z1) of the output-side conducting circuit 49 is connected to the monitor 60 in the optical communication apparatus 42, so that the monitor 60 detects an increase in resistance value. Further, only the impedance 62 (Z2) of the output-side conducting circuit 52 is connected to the monitor 63 in the optical communication apparatus 43, so that the monitor 63 detects an increase in resistance value.

Accordingly, in the optical communication apparatus 42, the output control portion 65 controls emission of light from the laser diode 64 to stop. Alternatively, it suppresses the quantity of light emitted from the laser diode 64 to a value not larger than a predetermined value. Further, in the optical communication apparatus 43, the output control portion 68 controls emission of light from the laser diode 67 to stop. Alternatively, it suppresses the quantity of light emitted from the laser diode 67 to the value not larger than the predetermined value.

As described above, in the optical communication system 41 of the third embodiment, it is possible to stop emission of light from the laser diode 64 in the optical communication apparatus 42 or suppress the quantity is of light emitted from the laser diode 64 in all of the cases where the optical fiber cable 44 is extracted from the optical communication apparatus 42, where the optical fiber cable 44 is extracted from the optical communication apparatus 43, and where the optical fiber cable 44 is broken. Further, it is possible to stop emission of light from the laser diode 67 in the optical communication apparatus 43 or suppress the quantity of light emitted from the laser diode 67.

Accordingly, if the optical fiber cable 44 is extracted or broken in an optical communication system for performing multi-core bi-directional optical communication, this invention prevents laser light from leaking out of an optical communication apparatus from which the optical fiber cable 44 is extracted or the broken optical fiber cable 44, thereby improving safety. Also, if communication is disabled, the laser diodes 64 and 67 can be, for example, stopped from emitting light, thereby reducing power consumption.

Figure 14:
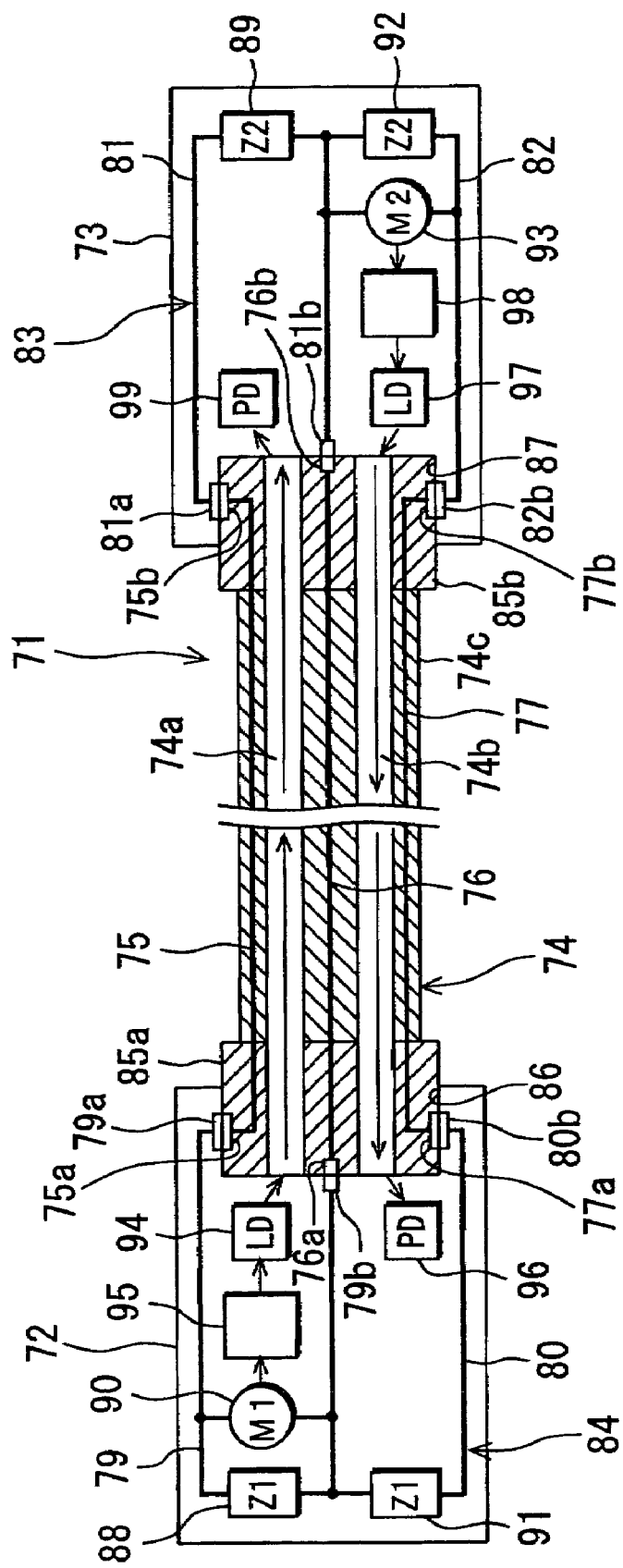
FIG. 14 is a conceptual diagram for showing a configuration of an optical communication system according to a fourth embodiment of the invention.
Figure 15:
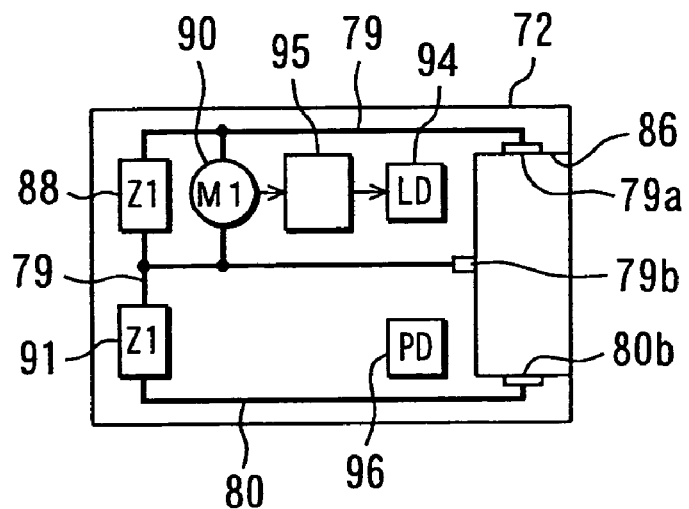
FIG. 15 is a conceptual diagram for showing a configuration of an optical communication apparatus that constitutes the optical communication system of the fourth embodiment of the invention.
Figure 16:
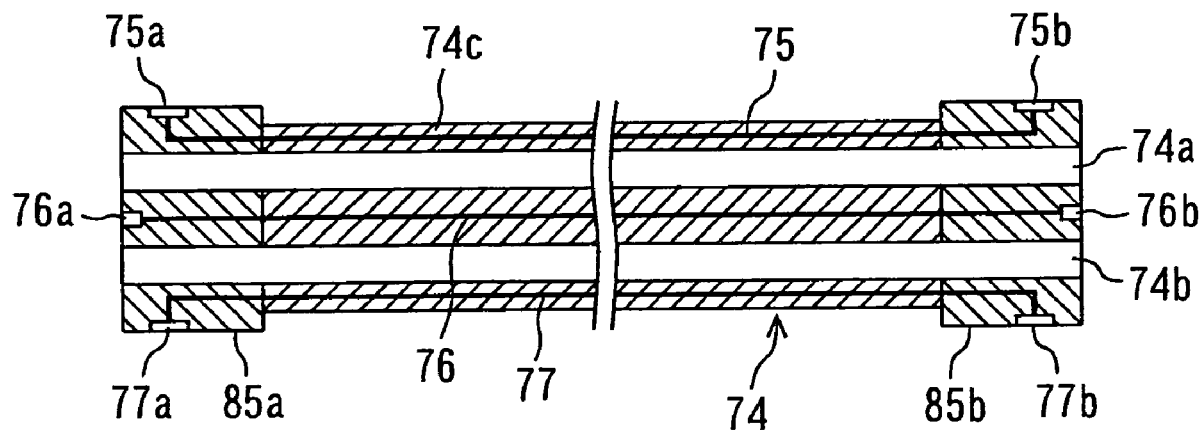
FIG. 16 is a conceptual diagram for showing a configuration of an optical fiber cable that constitutes the optical communication system of the fourth embodiment of the invention.

The following will describe a fourth embodiment of an optical communication system according to the invention. FIG. 14 is a conceptual diagram for showing a configuration of an optical communication system according to the fourth embodiment. FIG. 15 is a conceptual diagram for showing a configuration of an optical communication apparatus that constitutes the optical communication system of the fourth embodiment. FIG. 16 is a conceptual diagram for showing a configuration of an optical fiber cable that constitutes the optical communication system of the fourth embodiment.

An optical communication system 71 of the fourth embodiment has such a configuration that an optical communication apparatus 72 and an optical communication apparatus 73 are coupled to each other through an optical fiber cable 74 to realize a multi-core bi-directional optical communication. This is obtained by combining some of the conducting wires into one wire commonly used by the first and second detection circuits in an optical communication system of the third embodiment. Although the optical communication apparatus 72 is shown in FIG. 15, the optical communication apparatus 73 has the same configuration as that of the optical communication apparatus 72.

The optical fiber cable 74 is one example of the optical cable and, as shown in FIG. 16, has a configuration that a coating 74c covers two optical fiber cores 74a and 74b through which an optical signal is propagated. The optical fiber cable 74 is provided with three conducting wires 75, 76, and 77 along these optical fiber cores 74a and 74b. The conducting wires 75, 76, and 77 constitute the inter-apparatus conductor and electrically interconnect the optical communication apparatuses 72 and 73 coupled to each other through the optical fiber cable 74.

The optical communication apparatus 72 comprises an output-side conducting circuit 79 connected to the conducting wires 75 and 76 and an input-side conducting circuit 80 connected to the conducting wires 76 and 77. It is to be noted that, in configuration, the output-side conducting circuit 79 and the input-side conducting circuit 80 can use the conducting wire 76 commonly.

The optical communication apparatus 73 also has a configuration similar to that of the optical communication apparatus 72 in that it comprises an input-side conducting circuit 81 connected to the conducting wires 75 and 76 and an output-side conducting circuit 82 connected to the conducting wires 76 and 77. It is to be noted that, in configuration, the output-side conducting circuit 82 and the input-side conducting circuit 81 can use the conducting wire 76 commonly.

The output-side conducting circuit 79 and the input-side conducting circuit 80 as well as the output-side conducting circuit 81 and the input-side conducting circuit 82 constitutes the internal conductor. The output-side conducting circuit 79, the input-side conducting circuit 81, and the conducting wires 75 and 76 are combined to constitute a first detection circuit 83. Further, the output-side conducting circuit 82, the input-side conducting circuit 80, and the conducting wires 76 and 77 are combined to constitute a second detection circuit 84.

The optical fiber cable 74 is attached to and detached from each of the optical communication apparatuses 72 and 73. When the optical communication apparatuses 72 and 73 are coupled to each other through the optical fiber cable 74, the first detection circuit 83 and the second detection circuit 84 are constituted.

Specifically, the optical fiber cable 74 is provided with a plug 85a at its one end and with a plug 85b at its other end. These plugs 85a and 85b constitute the attachment. The following description is made on the assumption that the plug 85a is connected to the optical communication apparatus 72 and the plug 85b, to the optical communication apparatus 73.

The optical communication apparatus 72 comprises a jack 86 which the plug 85a is inserted into and extracted from as shown in FIG. 15. Similarly, the optical communication apparatus 73 comprises a jack 87 which the plug 85b is inserted into and extracted from. This gives such a configuration that the optical fiber cable 74 can be attached to and detached from each of the optical communication apparatuses 72 and 73.

The one plug 85a of the optical fiber cable 74 comprises one terminal 75a of the conducting wire 75, one terminal 76a of the conducting wire 76, and one terminal 77a of the conducting wire 77. The other plug 85b, on the other hand, comprises the other terminal 75b of the conducting wire 75, the other terminal 76b of the conducting wire 76, and the other terminal 77b of the conducting wire 77.

The jack 86 of the optical communication apparatus 72 comprises one terminal 79a and the other terminal 79b of the output-side conducting circuit 79. This terminal 79b serves also as one terminal of the input-side conducting circuit 80. The jack 86, on the other hand, comprises the other terminal 80b of the input-side conducting circuit 80. Similarly, the jack 87 of the optical communication apparatus 73 comprises one terminal 81a and the other terminal 81b of the input-side conducting circuit 81. This terminal 81b serves also as a terminal of the output-side conducting circuit 82. Furthermore, the jack 87 comprises the other terminal 82b of the output-side conducting circuit 82.

In this configuration, by inserting the one plug 85a of the optical fiber cable 74 into the jack 86 of the optical communication apparatus 72, the terminal 79a on the side of the jack 86 comes in contact with the terminal 75a on the side of the plug 85a and the terminal 79b on the side of the jack 86 comes in contact with the terminal 76a on the side of the plug 85a, so that the output-side conducting circuit 79 in the optical communication apparatus 72 is electrically connected to the conducting wires 75 and 76.

Further, the terminal 80b on the side of the jack 86 comes in contact with the terminal 77a on the side of the plug 85a, so that the input-side conducting circuit 80 in the optical communication apparatus 72 is electrically connected to the conducting wires 76 and 77.

By inserting the other plug 85b of the optical fiber cable 74 into the jack 87 of the optical communication apparatus 73, the terminal 81a on the side of the jack 87 comes in contact with the terminal 75b on the side of the plug 85b and the terminal 81b on the side of the jack 87 comes in contact with the terminal 76b on the side of the plug 85b, so that the input-side conducting circuit 81 in the optical communication apparatus 73 is electrically connected to the conducting wires 75 and 76.

Further, the terminal 82b on the side of the jack 87 comes in contact with the terminal 77b on the side of the plug 85b, so that the output-side conducting circuit 82 in the optical communication apparatus 73 is electrically connected to the conducting wires 76 and 78.

By thus inserting the one plug 85a of the optical fiber cable 74 into the jack 86 of the optical communication apparatus 72 and the other plug 85b of the optical fiber cable 74 into the jack 87 of the optical communication apparatus 73, each of the output-side conducting circuit 79 provided to the optical communication apparatus 72 and the input-side conducting circuit 81 provided to the optical communication apparatus 73 is connected to the conducting wires 75 and 76 provided to the optical fiber cable 74, thereby constituting the first detection circuit 83.

Further, each of the input-side conducting circuit 80 provided to the optical communication apparatus 72 and the output-side conducting circuit 82 provided to the optical communication apparatus 73 is connected to the conducting wires 76 and 77 provided to the optical fiber cable 74, thereby constituting the second detection circuit 84.

The first detection circuit 83 and the second detection circuit 84 detects extraction or breakage of the optical fiber cable 74 because they are each arranged to vary, for example, in circuit resistance if the optical fiber cable 74 is extracted from the optical communication apparatus 72 or 73 or if the optical fiber cable 74 is broken.

The first detection circuit 83 is arranged, for example, to have a power supply, not shown, provided in the output-side conducting circuit 79 and an impedance 88 having an arbitrary resistance value (Z1). The input-side conducting circuit 81 is provided with an impedance 89 having an arbitrary resistance value (Z2). The first detection circuit 83 has such a configuration that the impedances 88 and 89 are connected in parallel. Further, the output-side conducting circuit 79 is provided with a monitor 90. The monitor 90 measures, for example, a resistance value of the detection circuit 83.

The second detection circuit 84 is arranged, for example, to have an impedance 91 having the arbitrary resistance value (Z1) provided to the input-side conducting circuit 80. The output-side conducting circuit 82 is provided with a power supply, not shown, and an impedance 92 having the arbitrary resistance value (Z2). The second detection circuit 84 has such a configuration that the impedances 91 and 92 are connected in parallel. Further, the output-side conducting circuit 82 is provided with a monitor 93. The monitor 93 measures, for example, a resistance value of the second detection circuit 84.

The optical communication apparatus 72 comprises a laser diode 94 as opposed to the optical fiber core 74a of the optical fiber 74 coupled to the jack 86. This laser diode 94 constitutes the light emitter and emits signal light, which enters the optical fiber core 74a of the optical fiber cable 74.

Further, the optical communication apparatus 72 comprises a drive circuit, not shown, for driving a laser diode 94 and an output control portion 95 for controlling this drive circuit to control emission of light from the laser diode 94. The output control portion 95 constitutes the controller and controls output power of the laser diode 94 if the monitor 90, which monitors a state of conduction of the first detection circuit 83, detects a change, for example, in resistance value of the first detection circuit 83.

The optical communication apparatus 72 further comprises a photodiode 96 as opposed to the optical fiber core 74b of the optical fiber cable 74 coupled to the jack 86. This photodiode 96 constitutes the light receiver and receives signal light launched from the optical fiber core 74b of the optical fiber cable 74.

Similarly, the optical communication apparatus 73 comprises a laser diode 97 as opposed to the optical fiber core 74b of the optical fiber cable 74 coupled to the jack 87. This laser diode 97 constitutes the light emitter and emits signal light, which enters the optical fiber core 74b of the optical fiber cable 74.

Further, the optical communication apparatus 73 comprises a drive circuit, not shown, for driving the laser diode 97 and an output control portion 98 for controlling this drive circuit to control emission of light from the laser diode 97. The output control portion 98 constitutes the controller and controls output of the laser diode 97 if the monitor 93, which monitors a state of conduction of the second detection circuit 84, detects a change, for example, in resistance value of the second detection circuit 84.

The optical communication apparatus 73 further comprises a photodiode 99 as opposed to the optical fiber core 74a of the optical fiber cable 74 coupled to the jack 87. This photodiode 99 constitutes the light receiver and receives signal light launched from the optical fiber core 74a of the optical fiber cable 74.

Figure 17A:
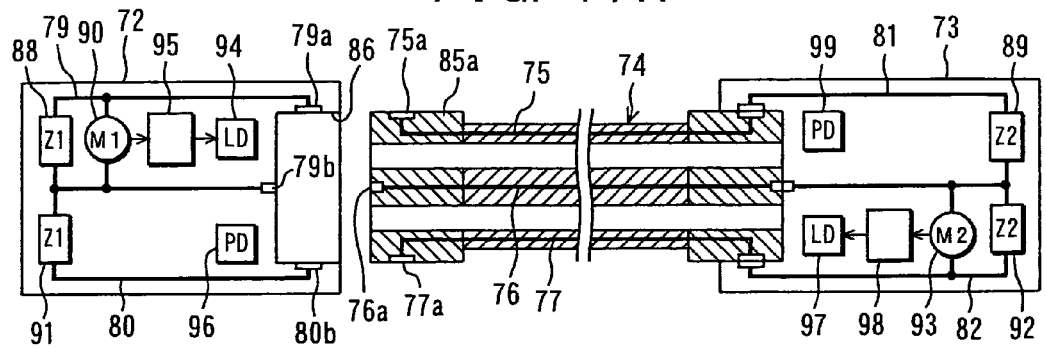
FIGS. 17A–17C are conceptual diagrams each for showing operations of the optical communication system of the fourth embodiment of the invention.
Figure 17B:
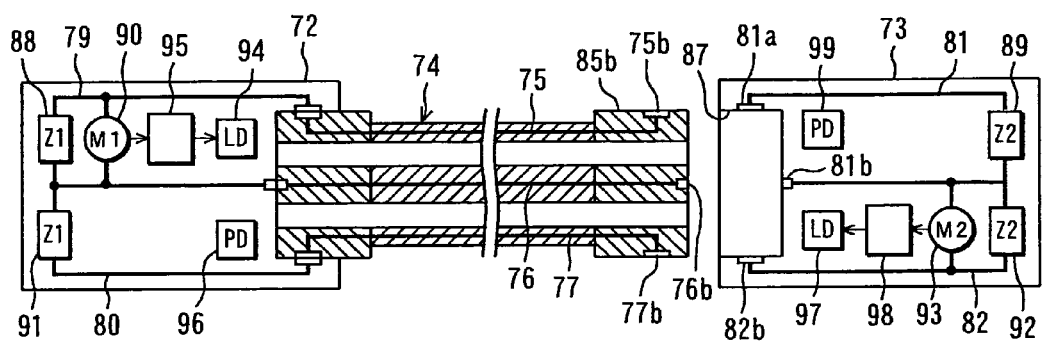
Figure 17C:
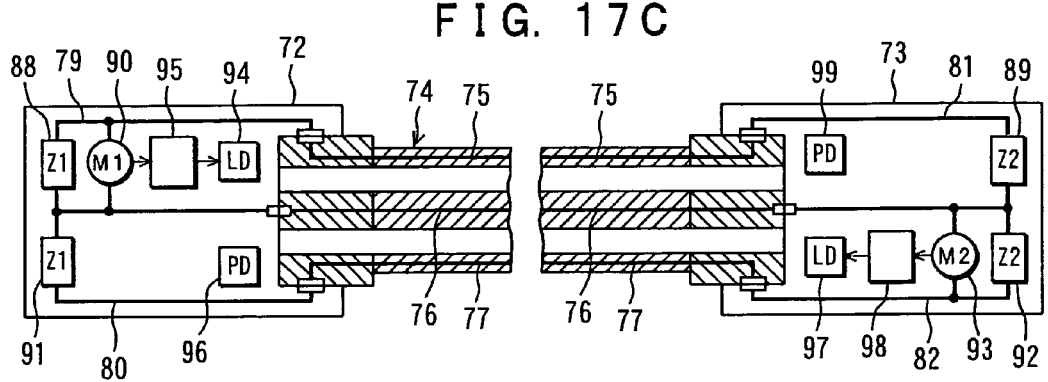

FIGS. 17A–17C are conceptual diagrams for showing operations of the fourth embodiment of the optical communication system according to the invention. The following will describe the operations of the optical communication system 71 of the fourth embodiment with reference to the drawings. First, as shown in FIG. 14, the one plug 85a of the optical fiber cable 74 is inserted into the jack 86 of the optical communication apparatus 72 and the other plug 85b of the optical fiber cable 74 is inserted into the jack 87 of the optical communication apparatus 73. This gives such a configuration of the optical communication system 71 that the optical communication apparatuses 72 and 73 are coupled to each other through the optical fiber cable 74.

In the optical communication system 71, when the optical communication apparatus 72 receives an electric signal, the laser diode 94 converts this electric signal into signal light and emits it. The signal light emitted from the laser diode 94 in the optical communication apparatus 72 is propagated through the optical fiber core 74a of the optical fiber cable 74 and impinges on the photodiode 99 in the optical communication apparatus 73. Then, the photodiode 99 converts the signal light into an electric signal and outputs it to an outside of the optical communication apparatus 73.

When the optical communication apparatus 73 receives an electric signal, the laser diode 97 converts this electric signal into signal light and emits it. The signal light emitted from the laser diode 97 in the optical communication apparatus 73 is propagated through the optical fiber core 74b of the optical fiber cable 74 and impinges on the photodiode 96 in the optical communication apparatus 72. Then, the photodiode 96 converts the signal light into an electric signal and outputs it to an outside of the optical communication apparatus 72.

In such a manner, multi-core bi-directional optical communication between the optical communication apparatuses 72 and 73 is realized in the optical communication system 71 of the fourth embodiment.

In this optical communication system 71, each of the output-side conducting circuit 79 in the optical communication apparatus 72 and the input-side conducting circuit 81 in the optical communication apparatus 73 is connected to the conducting wires 75 and 77 of the optical fiber cable 74, thereby constituting the first detection circuit 83. Further, each of the input-side conducting circuit 80 in the optical communication apparatus 72 and the output-side conducting circuit 82 in the optical communication apparatus 73 is connected to the conducting wires 76 and 77 of the optical fiber cable 74, thereby constituting the second detection circuit 84.

In this configuration, the monitor 90 provided to the output-side conducting circuit 79 of the optical communication apparatus 72 monitors the state of conduction of the first detection circuit 83 and the output control portion 95 controls emission of light from the laser diode 94. Further, the monitor 93 provided to the output-side conducting circuit 82 in the optical communication apparatus 73 monitors the state of conduction of the second detection circuit 84 and the output control portion 98 controls emission of light from the laser diode 97.

Since the output-side conducting circuit 79 and the input-side conducting circuit 81 are connected to each other through the conducting wires 75 and 76 in the first detection circuit 83, both of the impedances 88 and 89 are connected to the monitor 90 provided to the optical communication apparatus 72.

As can be seen from the above, in a condition where the optical communication apparatuses 72 and 73 are normally coupled to each other through the optical fiber cable 74, the output-side conducting circuit 79 and the input-side conducting circuit 81 are connected to each other, so that the resistance value of the first detection circuit 83 becomes a parallel-connection resistance value of the impedance 88 (Z1) and the impedance 89 (Z2).

Accordingly, the monitor 90 recognizes the case where the resistance value of the first detection circuit 83 is a parallel-connection resistance value of the impedance 88 (Z1) and the impedance 89 (Z2) as a normal state of conduction of the first detection circuit 83. It is to be noted that a case where a voltage or current value of the first detection circuit 83 corresponds to this parallel-connection resistance value may be recognized as the normal state of conduction of the first detection circuit 83. In the following description, the resistance value is to be monitored.

Since the input-side conducting circuit 80 and the output-side conducting circuit 82 are connected to each other through the conducting wires 76 and 77 in the second detection circuit 84, both of the impedances 91 and 92 are connected to the monitor 93 provided to the optical communication apparatus 73.

As can be seen from the above, in a condition where the optical communication apparatuses 72 and 73 are normally coupled to each other by the optical fiber cable 74, the input-side conducting circuit 80 and the output-side conducting circuit 82 are connected to each other, so that the resistance value of the second detection circuit 84 becomes a parallel-connection resistance value of the impedance 91 (Z1) and the impedance 92 (Z2).

Accordingly, the monitor 93 recognizes the case where the resistance value of the second detection circuit 84 is a parallel-connection resistance value of the impedance 91 (Z1) and the impedance 92 (Z2) as a normal state of conduction of the second detection circuit 84.

If the optical fiber cable 74 is extracted from the optical communication apparatus 72 as shown in FIG. 17A, the plug 85a comes off from the jack 86, so that the terminal 79a on the side of the jack 86 is separated from the terminal 75a on the side of the plug 85a and the terminal 79b on the side of the jack 86 is separated from the terminal 76a on the side of the plug 85a.

As a result, the output-side conducting circuit 79 is electrically cut off from the conducting wires 75 and 76. That is, the output-side conducting circuit 79 and the input-side conducting circuit 81 are electrically cut off from each other.

Further, the plug 85a is extracted from the jack 86, so that the terminal 80b on the side of the jack 86 is separated from the terminal 77a on the side of the plug 85a. As a result, the input-side conducting circuit 80 is electrically cut off from the conducting wires 76 and 77. That is, the input-side conducting circuit 80 and the output-side conducting circuit 82 are electrically cut off from each other.

In such a manner, if the optical fiber cable 74 is extracted from the optical communication apparatus 72, only the impedance 88 (Z1) of the output-side conducting circuit 79 is connected to the monitor 90 provided to the optical communication apparatus 72. Therefore, in the optical communication apparatus 72, the monitor 90 detects an increase in resistance value.

Accordingly, in the optical communication apparatus 72, the output control portion 95 control emission of light from the laser diode 94 to stop. Alternatively, it controls suppression of a quantity of light emitted from the laser diode 94 to a value not larger than a predetermined value.

Further, if the optical fiber 74 is extracted from the optical communication apparatus 72, only the impedance 92 (Z2) of the output-side conducting circuit 82 is connected to the monitor 93 provided to the optical communication apparatus 73. Therefore, in the optical communication apparatus 73, the monitor 93 detects an increase in resistance value.

Accordingly, in the optical communication apparatus 73, the output control portion 98 controls emission of light from the laser diode 97 to stop. Alternatively, it controls suppression of a quantity of light emitted from the laser diode 97 to a value not larger than a predetermined value.

In such a manner, in the optical communication system 71 of the fourth embodiment for performing multi-core bi-directional optical communication, if the optical fiber cable 74 is extracted from the one optical communication apparatus 72, it is possible not only to, for example, stop emission of light from the laser diode 94 in the optical communication apparatus 72 from which the optical fiber cable 74 is extracted, but also to stop emission of light from the laser diode 97 in the other optical communication apparatus 73.

Also if the optical fiber cable 74 is extracted from the optical communication apparatus 73 as shown in FIG. 17B, similar control is conducted. That is, if the optical fiber cable 74 is extracted from the optical communication apparatus 73, the plug 85b comes off from the jack 87, so that the terminal 81a on the side of the jack 87 is separated from the terminal 75b on the side of the plug 85b, the terminal 81b on the side of the jack 87 is separated from the terminal 76b on the side of the plug 85b, and the terminal 82b on the side of the jack 87 is separated from the terminal 77b on the side of the plug 85b.

As a result, the output-side conducting circuit 82 is electrically cut off from the conducting wires 76 and 77, so that the output-side conducting circuit 82 and the input-side conducting circuit 80 are cut off from each other electrically. Further, the input-side conducting circuit 81 is electrically cut off from the conducting wires 75 and 76, so that the output-side conducting circuit 79 and the input-side conducting circuit 81 are cut off from each other electrically.

In such a manner, if the optical fiber cable 74 is extracted from the optical communication apparatus 73, only the impedance 92 (Z2) of the output-side conducting circuit 82 is connected to the monitor 93 in the optical communication apparatus 73. Therefore, in the optical communication apparatus 73, the monitor 93 detects an increase in resistance value.

Accordingly, in the optical communication apparatus 73, the output control portion 98 controls emission of light from the laser diode 97 to stop. Alternatively, it controls suppression of the quantity of light emitted from the laser diode 97 to the value not larger than the predetermined value.

Further, if the optical fiber cable 74 is extracted from the optical communication apparatus 73, the output-side conducting circuit 79 and the input-side conducting circuit 81 are cut off from each other electrically, so that only the impedance 88 (Z1) of the output-side conducting circuit 79 is connected to the monitor 90 in the optical communication apparatus 72. Therefore, the monitor 90 in the optical communication apparatus 72 also detects an increase in resistance value.

Accordingly, in the optical communication apparatus 72, the output control portion 95 controls emission of light from the laser diode 94 to stop. Alternatively, it controls suppression of the quantity of light emitted from the laser diode 94 to the value not larger than the predetermined value.

In such a manner, if the optical fiber cable 74 is extracted from the other optical communication apparatus 73, it is possible not only to, for example, stop emission of light from the laser diode 97 in the optical communication apparatus 73 from which the optical fiber cable 74 is extracted, but also to stop emission of light from the laser diode 94 in the other optical communication apparatus 72.

Further, if the optical fiber cable 74 is broken as shown in FIG. 17C, the conducting wires 75, 76, and 77 are cut, so that the output-side conducting circuit 79 and the input-side conducting circuit 81 are electrically cut off from each other and the output-side conducting circuit 82 and the input-side conducting circuit 80 are electrically cut off from each other.

Therefore, also if the optical fiber 74 is broken, only the impedance 88 (Z1) of the output-side conducting circuit 79 is connected to the monitor 90 in the optical communication apparatus 72, so that the monitor 90 detects an increase in resistance value. Further, only the impedance 92 (Z2) of the output-side conducting circuit 82 is connected to the monitor 93 in the optical communication apparatus 73, so that the monitor 93 detects an increase in resistance value.

Accordingly, in the optical communication apparatus 72, the output control portion 95 controls emission of light from the laser diode 94 to stop. Alternatively, it controls suppression of the quantity of light emitted from the laser diode 94 to a value not larger than a predetermined value. Further, in the optical communication apparatus 73, the output control portion 98 controls emission of light from the laser diode 97 to stop. Alternatively, it controls suppression of the quantity of light emitted from the laser diode 97 to the value not larger than the predetermined value.

As described above, in the optical communication system 71 of the fourth embodiment, it is possible to stop emission of light from the laser diode 94 in the optical communication apparatus 72 or suppress the quantity of light emitted from the laser diode 94 in all of the cases where the optical fiber cable 74 is extracted from the optical communication apparatus 72, where the optical fiber cable 74 is extracted from the optical communication apparatus 73, and where the optical fiber cable 74 is broken. It is also possible to stop emission of light from the laser diode 97 in the optical communication apparatus 73 or suppress the quantity of light emitted from the laser diode 97.

Accordingly, in a case where the optical fiber cable 74 is extracted or broken, this invention prevents laser light from leaking, thereby improving safety. Also, if communication is disabled, the laser diodes 94 and 97 are, for example, stopped from emitting light, thereby reducing power consumption.

Further, the conducting wire 76 can be used commonly by the first detection circuit 83 and the second detection circuit 84 to reduce the number of the conducting wires as compared to an optical communication system of the third embodiment, thereby reducing costs.

Although the above embodiments have been described with reference to an example where a laser diode is used as one example of the light emitter, the present invention can be applied also to an optical communication apparatus which uses any other light emitting element such as a light emitting diode. Further, the configuration of the detection circuit has been given just as one example and needs only to vary in circuit resistance etc. if the optical fiber cable is extracted or broken.

FIGS. 18A through 20J are cross-sectional views each for showing configuration of an optical fiber cable. The following will describe embodiments of the optical fiber cables, especially, layouts of conducting wires with reference to the drawings. FIGS. 18A–18J show a configuration of each of the optical fiber cables 4, which are used in optical communication systems of the first and second embodiments.

FIGS. 18A–18J show examples of the optical fiber cables 4 where their coatings 4b have rectangular cross-sectional shapes. FIG. 18A shows an example where the single optical fiber core 4a is provided with the linear conducting wires 5 and 6 on both sides thereof in such a manner that the conducting wires 5 and 6 may be arranged along the optical fiber core 4a as shown in FIG. 5 etc.

FIGS. 18B and 18C show examples where in each example, the single optical fiber core 4a is provided with the two conducting wires 5 and 6 in such a manner that they may close it round concentrically. Outer one of the two conducting wires 5 and 6, for example, the conducting wire 6 may be provided inside the coating 4b as shown in FIG. 18B or on a surface of the coating 4b as shown in FIG. 18C. A cross-sectional shape of each of the conducting wires 5 and 6 is rectangular to fit the coating 4b.

FIGS. 18D and 18E show examples where in each example, the coating 4b is provided with the strip-shaped conducting wires 5 and 6 on its surface. Since the conducting wires 5 and 6 need to be insulated from each other, these conducting wires 5 and 6 are provided on mutually opposite faces of the coating 4b having a rectangular cross-sectional shape. It is to be noted that in a configuration where the conducting wires are provided on the surface of the coating, a tape-shaped conducting member may be adhered to the coating.

FIGS. 18F–18J show examples where in each example, the coating 4b of the optical fiber cable 4 has a circular cross-sectional shape. FIGS. 18F and 18G show examples where in each example, the single optical fiber core 4a is provided with the linear conducting wires 5 and 6 on both sides thereof. The coating 4b may have an ellipsoidal cross-sectional shape as shown in FIG. 18F or a circular one as shown in FIG. 18G.

FIGS. 18H and 18I show examples where in each example, the single optical fiber core 4a is provided with the two conducting wires 5 and 6 in such a manner that they may close it round concentrically. Outer one of the two conducting wires 5 and 6, for example, the conducting wire 6 may be provided inside the coating 4b as shown in FIG. 18H or on the surface of the coating 4b as shown in FIG. 18I. The cross-sectional shape of each of the conducting wires 5 and 6 is circular to fit the coating 4b.

FIG. 18J shows an example where the coating 4b is provided with the strip-shaped conducting wires 5 and 6 on its surface. The conducting wires 5 and 6 are arranged with a gap therebetween so that they may be insulated from each other.

FIGS. 19A–19J show a configuration of each the optical fiber cables 44, which are used in an optical communication system of the third embodiment. FIGS. 19A–19E show examples of the optical fiber cables 44 where their coatings 44c have a rectangular cross-sectional shape. FIG. 19A shows an example where the optical fiber core 44a is provided with the linear conducting wires 45 and 46 on both sides thereof and the optical fiber core 44b is provided with the linear conducting wires 47 and 48 on both sides thereof in such a manner that the conducting wires 45 and 46 and the conducting wires 47 and 48 may be arranged along the optical fiber cores 44a and 44b respectively as shown in FIG. 12 etc.

FIGS. 19B and 19C show examples wherein each example, the optical fiber core 44a is provided with the two conducting wires 45 and 46 in such a manner that they may close it round concentrically and the fiber core 44b is provided with the two conducting wires 47 and 48 in such a manner that they may close it round concentrically. Outer one of the two conducting wires 45 and 46, for example, the conducting wire 46 and outer one of the two conducting wires 47 and 48, for example, the conducting wire 48 may be provided inside the coating 44c as shown in FIG. 19B or on a surface of the coating 44c as shown in FIG. 19C. A cross-sectional shape of each of the conducting wires 45, 46, 47, and 48 is rectangular to fit the coating 44c.

FIGS. 19D and 19E show examples where in each example, the coating 44c is provided with the strip-shaped conducting wires 45, 46, 47, and 48 on its surface. These conducting wires may be provided each pair on each of the mutually opposing faces of the rectangular coating 44c as shown, for example, in FIG. 19D or each on each of the faces of the rectangular coating 44c as shown in FIG. 19E so that they may be insulated from each other.

FIGS. 19F–19J show examples where in each example, the coating 44c of the optical fiber cable 44 has a circular cross-sectional shape. FIGS. 19F and 19G show examples where in each example, the linear conducting wires 45, 46, 47, and 48 are provided around the optical fiber cores 44a and 44b. The coating 44c may have an ellipsoidal cross-sectional shape as shown in FIG. 19F or a circular one as shown in FIG. 19G.

FIGS. 19H and 19I show examples where in each example, the optical fiber cores 44a and 45b are provided with the four conducting wires 45, 46, 47, and 48 in such a manner that they may close it round concentrically. An outermost one of the plurality of conducting wires, for example, the conducting wire 48 may be provided inside the coating 44c as shown in FIG. 19H or on the surface of the coating 44c as shown in FIG. 19I. The cross-sectional shape of each of the conducting wires 45, 46, 47, and 48 is circular to fit the coating 44c.

FIG. 19J shows an example where the coating 44c is provided with the strip-shaped conducting wires 45, 46, 47, and 48 on its surface. The conducting wires are arranged with a gap therebetween so that they may be insulated from each other.

FIGS. 20A–20J shows a configuration of each of the optical fiber cables 74, which are used in an optical communication system of the fourth embodiment. FIGS. 20A–20E show examples of the optical fiber cables 74 wherein their coatings 74c have a rectangular cross-sectional shape. FIG. 20A shows an example where the linear conducting wires 75, 76, and 77 are provided in a direction in which the optical fiber cores 74a and 74b are arranged in such a configuration that the conducting wires 75, 76, and 77 are arranged along the optical fiber cores 74a and 74b as shown in FIG. 16 etc.

FIGS. 20B and 20C show examples where in each example, the optical fiber core 74a is provided with the conducting wire 75 in such a manner that this wire may close it round concentrically, the fiber core 74b is provided with the conducting wire 76 in such a manner that this wire may close it round concentrically, and the conducting wire 77 is provided in such a manner as to close these conducting wires 75 and 76 round. The outermost conducting wire 77 may be provided inside the coating 74c as shown in FIG. 20B or on a surface of the coating 74c as shown in FIG. 20C. A cross-sectional shape of each of the conducting wires 75, 76, and 77 is rectangular to fit the coating 74c.

FIG. 20D shows an example where the coating 74c is provided with the strip-shaped conducting wires 75, 76, and 77 on its surface and inside it. For example, the conducting wires 75 and 76 are provided on the mutually opposite faces of the rectangular coating 74c and the conducting wire 77 is provided between the optical fiber cores 74a and 74b.

FIG. 20E shows an example where the coating 74c is provided with the strip-shaped conducting wires 75, 76, and 77 on its surface. For example, the conducting wires 75, 76, and 77 are provided on three faces of the coating 74c with a gap therebetween so that the conducting wires 75, 76, and 77 may be insulated from each other.

FIGS. 20F–20J show examples where the coatings 74c of the optical fiber cables 74 have circular cross-sectional shapes. FIGS. 20F and 20G show examples where the linear conducting wires 75, 76, and 77 are provided around the optical fiber cores 74a and 74b. The coatings 74c may have an ellipsoidal cross-sectional shape as shown in FIG. 20F or a circular one as shown in FIG. 20G.

FIGS. 20H and 20I show examples where the optical fiber cores 74a and 74b are provided with the three conducting wires 75, 76, and 77 in such a manner that they may close it round concentrically. An outermost one of the plurality of conducting wires, for example, the conducting wire 77 may be provided inside the coating 74c as shown in FIG. 20H or on the surface of the coating 74c as shown in FIG. 20I. The cross-sectional shape of each of the conducting wires 75, 76, and 77 is circular to fit the coating 74c.

FIG. 20J shows an example where the coating 74c is provided with the strip-shaped conducting wires 75,76, and 77 on its surface. The conducting wires are arranged with a gap therebetween so that they may be insulated from each other.

As described above, according to the present invention, in an optical communication system in which optical communication apparatuses are coupled to each other through an optical cable, by providing the optical cable with inter-apparatus conductor and providing each of the optical communication apparatuses with internal conductor connected to the inter-apparatus conductor, it is possible to constitute a detection circuit in which the internal conductors are connected to each other through the inter-apparatus conductor.

In this configuration, by providing the optical communication apparatus having light emitter with monitor for monitoring a state of conduction of this detection circuit and controller for controlling output power of the light emitter based on a result of monitoring by this monitor, it is possible to detect extraction and breakage of the optical cable, thereby controlling the output of the light emitter.

Therefore, not only in a case where the optical fiber is extracted from the optical communication apparatus that is adapted to output an optical signal but also in a case where the optical cable is extracted from the optical communication apparatus that is adapted to receive the optical signal, it is possible to stop emission light or suppress a quantity of light emitted.

While the foregoing specification has described preferred embodiment (s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. An optical communication system comprising:
   a first optical communication apparatus having a light emitter for outputting an optical signal;
   a second optical communication apparatus having a light receiver for receiving the optical signal; and
   an optical cable for coupling said first and second optical communication apparatuses to each other, said optical cable being attached to and detached from each of the first and second optical communication apparatuses,
   wherein said optical cable includes an inter-apparatus conductor for conducting electricity to the first and second optical communication apparatuses and each of the first and second optical communication apparatuses includes an internal conductor for connecting the inter-apparatus conductor to conduct electricity thereto;
   wherein said inter-apparatus conductor has a plurality of conducting wires, the conducting wires being provided inside of a coating that covers a fiber core;
   wherein the first and second optical communication apparatuses are coupled to each other by means of the optical cable to constitute a detection circuit for detecting a connection of the optical cable, said detecting circuit being constituted by connecting the internal conductors of the first and second optical communication apparatuses to each other through the inter-apparatus conductor; and
   wherein the first optical communication apparatus having the light emitter includes a monitor for monitoring a state of conduction of the detection circuit, and a controller for controlling output of the light emitter based on a result of monitoring by the monitor.

2. The optical communication system according to claim 1, wherein the light emitter is a laser diode; and
   wherein if the monitor monitors the state of conduction of the detection circuit to detect a change therein, the controller allows emission of light from the light emitter to stop.

3. The optical communication system according to claim 1, wherein the light emitter is a laser diode; and
   wherein if the monitor monitors the state of conduction of the detection circuit to detect a change therein, the controller allows a quantity of light emitted from the light emitter to be suppressed.

4. The optical communication system according to claim 1, wherein the first optical communication apparatus further comprises a light receiver and the second optical communication apparatus further comprises a light emitter; and
   wherein the optical cable comprises one fiber core through which an optical signal is propagated, said fiber core propagating signal light from the light emitter of one of the first and second optical communication apparatuses and signal light from the light emitter of the other optical communication apparatus.

5. The optical communication system according to claim 1, wherein the first optical communication apparatus further comprises a light receiver and the second optical communication apparatus further comprises a light emitter; and
   wherein the optical cable comprises fiber cores each for respective pair of the light emitter and the light receiver, separate fiber cores propagating signal light from the light emitter of one of the first and second optical communication apparatuses and signal light from the light emitter of the other optical communication apparatus.

6. An optical communication apparatus comprising at least one light emitter for outputting an optical signal of a group of the light emitter and at least one light receiver for receiving an optical signal, said apparatus detachably coupling an optical cable on which signal light from the light emitter impinges, comprising:
   an internal conductor connected to inter-apparatus conductor that is included in the optical cable to constitute a detection circuit for detecting a connection of the optical cable, together with the other optical communication apparatus that is coupled to the other end of the optical cable via the inter-apparatus conductor;
   wherein said inter-apparatus conductor has a plurality of conducting wires, the conducting wires being provided inside of a coating that covers a fiber core;
   a monitor for monitoring a state of conduction of the detection circuit; and
   a controller for controlling output of the light emitter based on a result of monitoring by the monitor.

7. The optical communication apparatus according to claim 6, wherein the light emitter is a laser diode; and
   wherein if the monitor monitors the state of conduction of the detection circuit to detect a change therein, the controller allows emission of light from the light emitter to stop.

8. The optical communication apparatus according to claim 6, wherein the light emitter is a laser diode; and
   wherein if the monitor monitors the state of conduction of the detection circuit to detect a change therein, the controller allows a quantity of light emitted from the light emitter to be suppressed.

9. An optical communication apparatus detachably coupling an optical cable, said apparatus comprising:
a light receiver for receiving an optical signal through the optical cable; and
an internal conductor connected to inter-apparatus conductor included in the optical cable, to constitute a detection circuit for detecting a connection of the optical cable, together with the other optical communication apparatus which is coupled to the other end of the optical cable via the inter-apparatus conductors,
wherein said inter-apparatus conductor has a plurality of conducting wires, the conducting wires being provided inside a coating that covers a fiber core.

10. An optical cable for coupling to each other a first optical communication apparatus having a light emitter for emitting an optical signal and a second optical communication apparatus having a light receiver for receiving the optical signal, said cable comprising:
at least one fiber core for propagating the optical signal;
attachments each for attaching the optical cable detachably to each of the first and second optical communication apparatuses, said attachments being provided to one end and the other end of the fiber core; and
inter-apparatus conductor for interconnecting the attachments,
wherein the inter-apparatus conductor is connected to the internal conductor provided to each of the first and second optical communication apparatuses, thereby constituting a detection circuit for detecting a connection of the optical cable to each of the first and second optical communication apparatuses,
wherein said inter-apparatus conductor has a plurality of conducting wires, the conducting wires being provided inside a coating that covers said fiber core.

11. An optical communication system comprising:
a first optical communication apparatus having a light emitter for outputting an optical signal;
a second optical communication apparatus having a light receiver for receiving the optical signal; and
an optical cable for coupling said first and second optical communication apparatuses to each other, said optical cable being attached to and detached from each of the first and second optical communication apparatuses,
wherein said optical cable includes an inter-apparatus conductor for conducting electricity to the first and second optical communication apparatuses and each of the first and second optical communication apparatuses includes an internal conductor for connecting the inter-apparatus conductor to conduct electricity thereto;
wherein said inter-apparatus conductor has a plurality of conducting wires, the conducting wires being provided on a surface of a coating that covers a fiber core;
wherein the first and second optical communication apparatuses are coupled to each other by means of the optical cable to constitute a detection circuit for detecting a connection of the optical cable, said detecting circuit being constituted by connecting the internal conductors of the first and second optical communication apparatuses to each other through the inter-apparatus conductor; and
wherein the first optical communication apparatus having the light emitter includes a monitor for monitoring a state of conduction of the detection circuit, and a controller for controlling output of the light emitter based on a result of monitoring by the monitor.

12. An optical communication apparatus comprising at least one light emitter for outputting an optical signal of a group of the light emitter and at least one light receiver for receiving an optical signal, said apparatus detachably coupling an optical cable on which signal light from the light emitter impinges, comprising:
an internal conductor connected to inter-apparatus conductor that is included in the optical cable to constitute a detection circuit for detecting a connection of the optical cable, together with the other optical communication apparatus that is coupled to the other end of the optical cable via the inter-apparatus conductor;
wherein said inter-apparatus conductor has a plurality of conducting wires, the conducting wires being provided on a surface of a coating that covers a fiber core;
a monitor for monitoring a state of conduction of the detection circuit; and
a controller for controlling output of the light emitter based on a result of monitoring by the monitor.

13. An optical communication apparatus detachably coupling an optical cable, said apparatus comprising:
a light receiver for receiving an optical signal through the optical cable; and
an internal conductor connected to inter-apparatus conductor included in the optical cable, to constitute a detection circuit for detecting a connection of the optical cable, together with the other optical communication apparatus which is coupled to the other end of the optical cable via the inter-apparatus conductor,
wherein said inter-apparatus conductor has a plurality of conducting wires, the conducting wires being provided on a surface of a coating that covers a fiber core.

14. An optical cable for coupling to each other a first optical communication apparatus having a light emitter for emitting an optical signal and a second optical communication apparatus having a light receiver for receiving the optical signal, said cable comprising:
at least one fiber core for propagating the optical signal;
attachments each for attaching the optical cable detachably to each of the first and second optical communication apparatuses, said attachments being provided to one end and the other end of the fiber core; and
inter-apparatus conductor for interconnecting the attachments,
wherein the inter-apparatus conductor is connected to the internal conductor provided to each of the first and second optical communication apparatuses, thereby constituting a detection circuit for detecting a connection of the optical cable to each of the first and second optical communication apparatuses,
wherein said inter-apparatus conductor has a plurality of conducting wires, the conducting wires being provided on a surface of a coating that covers said fiber core.

* * * * *